United States Patent
Howard

(10) Patent No.: US 9,146,709 B2
(45) Date of Patent: Sep. 29, 2015

(54) SYSTEM AND METHOD FOR AUTOMATIC DETECTION OF DECOMPOSITION ERRORS

(71) Applicant: Massively Parallel Technologies, Inc., Boulder, CO (US)

(72) Inventor: Kevin D. Howard, Tempe, AZ (US)

(73) Assignee: Massively Parallel Technologies, Inc., Boulder, CO (US)

( * ) Notice: Subject to any disclaimer, the term of this patent is extended or adjusted under 35 U.S.C. 154(b) by 4 days.

(21) Appl. No.: 13/913,190

(22) Filed: Jun. 7, 2013

(65) Prior Publication Data

US 2013/0332904 A1 Dec. 12, 2013

Related U.S. Application Data

(60) Provisional application No. 61/657,530, filed on Jun. 8, 2012.

(51) Int. Cl.
*G06F 9/45* (2006.01)
*G06F 9/44* (2006.01)
*G06F 9/50* (2006.01)

(52) U.S. Cl.
CPC .. *G06F 8/20* (2013.01); *G06F 8/73* (2013.01); *G06F 8/74* (2013.01); *G06F 8/4452* (2013.01); *G06F 8/45* (2013.01); *G06F 8/456* (2013.01); *G06F 9/5066* (2013.01)

(58) Field of Classification Search
CPC ......... G06F 8/456; G06F 8/45; G06F 9/5066; G06F 8/4452; G06F 8/443; G06F 8/4441
See application file for complete search history.

(56) References Cited

U.S. PATENT DOCUMENTS

| | | | |
|---|---|---|---|
| 5,430,873 A | 7/1995 | Abe et al. | |
| 7,162,710 B1 | 1/2007 | Edwards et al. | |
| 7,747,422 B1* | 6/2010 | Sisley | 703/13 |
| 8,283,449 B2* | 10/2012 | Galipeau et al. | 530/351 |
| 8,762,946 B2* | 6/2014 | Howard | 717/123 |
| 2003/0079188 A1 | 4/2003 | McConaghy et al. | |
| 2003/0088860 A1* | 5/2003 | Wang | 717/153 |
| 2003/0140332 A1 | 7/2003 | Norton et al. | |
| 2003/0149968 A1 | 8/2003 | Imai | |
| 2004/0015775 A1 | 1/2004 | Simske et al. | |
| 2005/0188364 A1* | 8/2005 | Cockx et al. | 717/159 |
| 2006/0020949 A1 | 1/2006 | Hoshino et al. | |

(Continued)

FOREIGN PATENT DOCUMENTS

| | | |
|---|---|---|
| JP | 2010097426 A | 4/2010 |
| WO | 2007104158 A1 | 9/2007 |

OTHER PUBLICATIONS

Zhang et al., "Using Hammock Graphs to Structure Programs", IEEE, Apr. 2004, pp. 231-245; <http://ieeexplore.ieee.org/stamp/stamp.jsp?tp=&arnumber=1274043>.*

(Continued)

*Primary Examiner* — Thuy Dao
*Assistant Examiner* — Ben C Wang
(74) *Attorney, Agent, or Firm* — Lathrop & Gage LLP

(57) ABSTRACT

A system and method for detecting decomposition errors in a parallel processing software design having at least two decomposition levels, where each decomposition level has at least one process. The system and method further identifies improper control flow, looping structure and/or dataflow within the software design and restructures the software design to remove any improper elements.

18 Claims, 18 Drawing Sheets

(56) References Cited

U.S. PATENT DOCUMENTS

| | | |
|---|---|---|
| 2006/0136850 A1 | 6/2006 | Corbell, Jr. et al. |
| 2006/0282252 A1* | 12/2006 | Ciolfi .............................. 703/22 |
| 2007/0136290 A1* | 6/2007 | Shinnar et al. ..................... 707/8 |
| 2007/0294578 A1 | 12/2007 | Qiao et al. |
| 2008/0263506 A1 | 10/2008 | Broadfoot et al. |
| 2008/0307267 A1 | 12/2008 | Chandrasekaran |
| 2009/0024586 A1* | 1/2009 | Zhou ................................. 707/3 |
| 2009/0055625 A1* | 2/2009 | Howard et al. ................. 712/28 |
| 2009/0119484 A1 | 5/2009 | Mohl et al. |
| 2009/0150860 A1* | 6/2009 | Gschwind et al. ............ 717/104 |
| 2009/0241106 A1 | 9/2009 | Andersen |
| 2009/0265696 A1 | 10/2009 | Grice |
| 2010/0049941 A1* | 2/2010 | Howard ........................... 712/28 |
| 2010/0094924 A1* | 4/2010 | Howard et al. ............... 709/201 |
| 2010/0153908 A1 | 6/2010 | Sarkar et al. |
| 2010/0199257 A1* | 8/2010 | Biggerstaff ................... 717/104 |
| 2011/0283095 A1 | 11/2011 | Hall et al. |
| 2011/0314448 A1* | 12/2011 | Biggerstaff ................... 717/116 |
| 2012/0066664 A1* | 3/2012 | Howard .......................... 717/106 |
| 2012/0166765 A1* | 6/2012 | Gonion .......................... 712/200 |
| 2012/0221837 A1* | 8/2012 | Gonion .......................... 712/222 |
| 2012/0290883 A1* | 11/2012 | Kahlon ........................... 714/49 |
| 2013/0067443 A1* | 3/2013 | Howard .......................... 717/149 |
| 2013/0232184 A1* | 9/2013 | Grube et al. .................. 709/201 |
| 2013/0254743 A1* | 9/2013 | Howard .......................... 717/123 |
| 2013/0254751 A1* | 9/2013 | Howard .......................... 717/136 |
| 2013/0332903 A1* | 12/2013 | Howard .......................... 717/123 |
| 2014/0298286 A1* | 10/2014 | Howard .......................... 717/101 |
| 2014/0304684 A1* | 10/2014 | Howard .......................... 717/124 |
| 2014/0310678 A1* | 10/2014 | Howard .......................... 717/100 |
| 2014/0310680 A1* | 10/2014 | Howard .......................... 717/102 |
| 2014/0310684 A1* | 10/2014 | Howard .......................... 717/105 |
| 2014/0310689 A1* | 10/2014 | Howard .......................... 717/123 |
| 2014/0359590 A1* | 12/2014 | Kodosky et al. ............. 717/149 |
| 2015/0006316 A1* | 1/2015 | Zhou ............................. 705/26.7 |

OTHER PUBLICATIONS

Milan Češka, "Designing Data-Parallel Graph Algorithms for Model Checking", Masaryk University, Brno, Czech Republic, Apr. 2012, pp. 1-113; <http://is.muni.cz/th/99067/fi_d/thesis.pdf>.*

Barnat et al., "Computing Strongly Connected Components in Parallel on CUDA", May 16, 2011 IEEE, IPDPS'11, pp. 544-555; <http://ieeexplore.ieee.org/stamp/stamp.jsp?tp=&arnumber=6012868>.*

Merrill et al., "High-Performance and Scalable GPU Graph Traversal", Jan. 2015, ACM, pp. 14:1-14:30; <http://dl.acm.org/results.cfm?h=1&cfid=511364938&cftoken=39209020>.*

PCT Patent Application PCT/US2013/033125 International Search Report and Written Opinion dated Jun. 27, 2013, 9 pages.

PCT Patent Application PCT/US2013/044573 International Search Report and Written Opinion dated Jul. 22, 2013, 8 pages.

PCT Patent Application PCT/US2013/044818 International Search Report and Written Opinion dated Sep. 13, 2013, 9 pages.

U.S. Appl. No. 13/490,345 Office Action dated Aug. 30, 2013, 16 pages.

* cited by examiner

Note: No sequencing between transformations and no shared data

SYSTEM AND METHOD FOR AUTOMATIC DETECTION OF DECOMPOSITION ERRORS

RELATED APPLICATIONS

This application claims the benefit of priority to U.S. Provisional Patent Application Ser. No. 61/657,530, filed Jun. 8, 2012, entitled "System and Method for the Automatic Detection of Decomposition Errors." In addition, this application is related to U.S. patent application Ser. No. 13/490,345, titled "Method for Automatic Extraction of Designs from Standard Source Code," filed Jun. 6, 2012, and which provides details of extracting MPT Hierarchical Designs for enablement purposes herein. Each of the aforementioned applications is incorporated by reference in their entirety herein.

BACKGROUND

Decomposition of software as discussed in various top-down structure design models (Stephen J Mellor & Paul T. Ward in their work Structured Development for Real-time systems, or Clement L. McGowan & John R. Kelly in their book Top-down Structured Programming Techniques, or Grady Booch in his UML Distilled book among others) all show that hierarchical software designs have certain assumptions. The seminal assumption is that lower levels of design are related to higher levels of design, that is, all of the information contained in a higher design level must be represented in lower levels of the design. This assumption means that each level of decomposition can be reconciled with the next higher level of design until the highest level of design is reached. For example if data from a terminator enters a process at the context level then all such data must appear at the first level of decomposition. If all of the data does not appear then a decomposition error has occurred. Similarly all control, including looping structures found at one level must be reconciled at the higher level. Typically this reconciliation and decomposition error detection is performed manually.

Typically, a developer can only create control flows on an MPT Hierarchical Design graph that can be arrived at via functional decomposition. However, when a design is extracted from existing source code (as occurs with legacy code), control flows which allow for unstructured code are then possible. Unstructured code is code that cannot be arrived at using any functional decomposition model.

SUMMARY OF THE INVENTION

This document describes an automated method of detecting decomposition errors in decomposition diagrams. A system and method is disclosed herein for detecting decomposition errors in a parallel processing algorithm having at least two decomposition levels, where each decomposition level has at least one process. That is, the present system and method determines if the decomposition of an algorithm into components usable within a parallel processing environment is a well- or ill-formed decomposition.

DETAILED DESCRIPTION OF THE EMBODIMENTS

Figure 1:
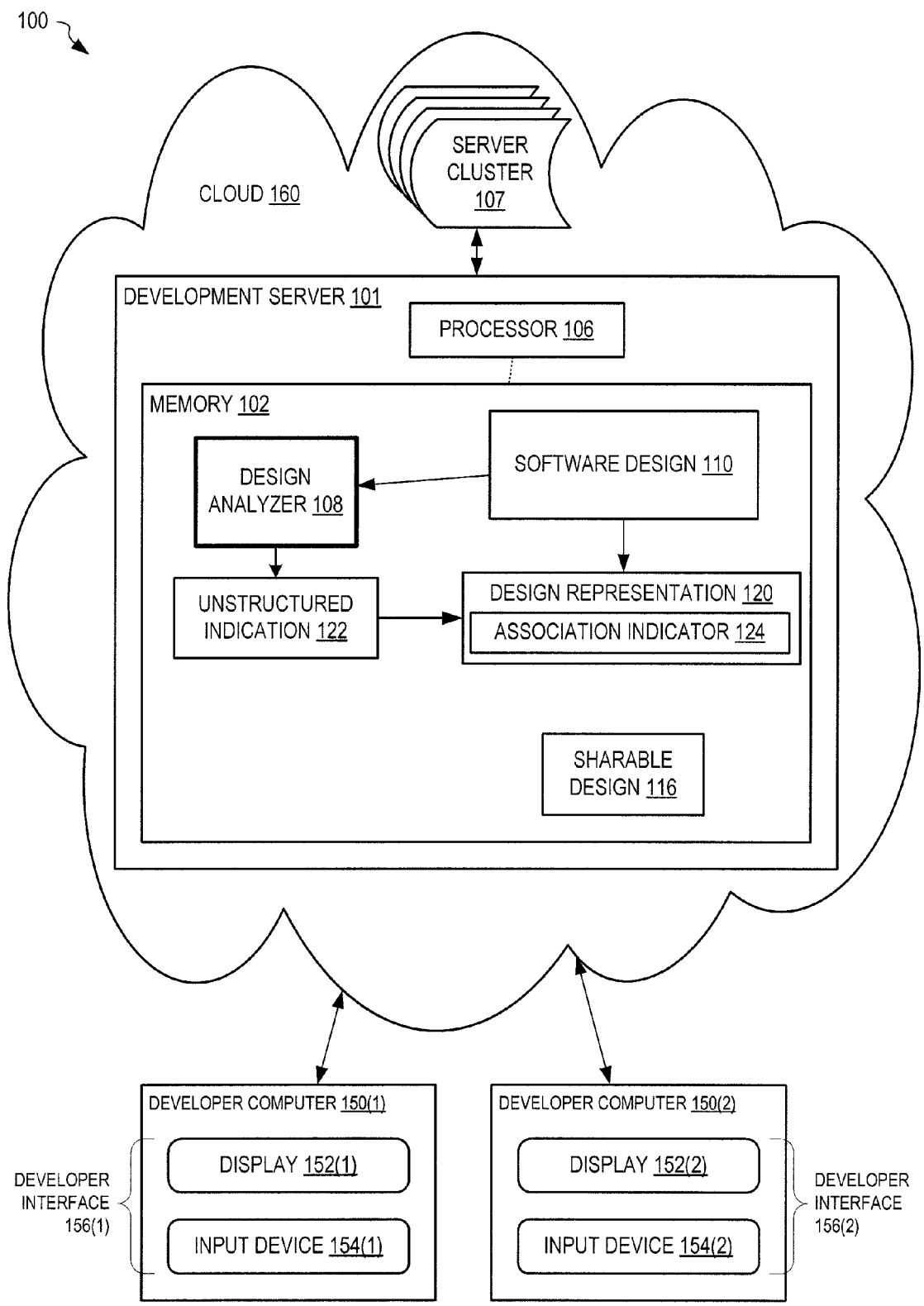
FIG. 1 depicts one exemplary system for detecting and restructuring badly structured code, in one embodiment.

As will be described below, embodiments of the present system and method automatically determine the quality of an algorithm's decomposition. That is, the embodiments determine whether the decomposition of an algorithm into components usable within a parallel processing environment is well or ill formed. Determining the quality of an algorithm's decomposition becomes particularly important when the decomposition is used to create an executable finite state machine. An ill formed decomposition used to create an executable finite state machine may lead to an inefficient or improperly functioning finite state machine.

Additionally, the MPT Hierarchical Design model defines work from the most abstract level down to where code occurs. All data flows, control-flow displays, data-storage looping structures, data-transformation processes (referred to as processes in this document), and control processes are defined. An MPT Hierarchical Design can be extracted from source code using techniques taught by U.S. patent application Ser. No. 13/490,345, titled "Method For Automatic Extraction of Designs From Standard Source Code," filed Jun. 6, 2012, and which is incorporated herein in its entirety. The description below discusses, inter alia, how a "Global View" of the MPT Hierarchical Design graph may indicate which control flows are possible from a decomposition model and which are not. Finally, methods that transform "decomposition impossible" control flows indicating unstructured code to "decomposition possible" control flows indicating structured code are shown.

DEFINITIONS

For the purpose of this document, the following definitions are supplied to provide guidelines for interpretation of the terms below as used herein:

Function—a software routine, or more simply an algorithm that performs one or more transformations.

Control Kernel—A control kernel, or "control" is a software routine or function that contains only the following types of computer-language constructs: subroutine calls, looping statements (for, while, do, etc.), decision statements (if-then-else, etc.), and branching statements (goto, jump, continue, exit, etc.).

Process Kernel—A process kernel, or "process", is a software routine or function that does not contain the following types of computer-language constructs: subroutine calls, looping statements, decision statements, or branching statements. Information is passed to and from a process kernel via RAM.

State Machine—The state machine employed herein is a two-dimensional network which links together all associated control kernels into a single non-language construct that provides for the activation of process kernels in the correct order. The process kernels form the "states" of the state-machine while the activation of those states form the state transition. This eliminates the need for software linker-loaders.

State Machine Interpreter—for the purpose of the present document, a State Machine Interpreter is a method whereby the states and state transitions of a state machine are used as active software, rather than as documentation.

Finite state machine—A finite state machine is an executable program constructed from the linear code blocks resulting from transformations, where the transformation-selection conditions are state transitions constructed from the control flow.

Terminator—A terminator is an event that occurs outside the scope of the current system or function.

Analyzing Decomposition

An analysis of a decomposition to determine its quality includes the following steps:
1. Determine that all input, output, and controls at an upper level of decomposition appear in its associated lower-level decompositions (see Context Level Analysis section and method 700 of FIG. 7, below),
2. Determine that all data stores attached at an upper level of decomposition appear in its associated lower-level decomposition (see Non-context Level Analysis section and method 800 of FIG. 8, below),
3. Determine a process' association (associated or unassociated—see Association Analysis section and method 900 of FIG. 9, below),
4. Determine that loops at higher decomposition levels are properly defined at lower decomposition levels, and add topology.

Note that the word "topology" in the present context is used in the computer science sense and indicates the shape and use of one-dimensional or higher data storage matrices. For example: the processing of a two dimensional matrix representing particles and particle movement can be very different depending upon the topology. With a Cartesian topology, this would mean that the particles disappear (fall off the edge) if their movement takes them past a matrix boundary. The same data would "wrap-around" from one boundary to another boundary if the topology were toroidal. (see Association Analysis section and method 900 of FIG. 9, below).

Computing Environment

FIG. 1 depicts one exemplary system 100 for detecting and restructuring badly structured code, in one embodiment. System 100 includes a development server 101 that is located, for example, within cloud 160. Cloud 160 represents a computer communication network that may include the Internet and other computer networking technologies.

Figure 2:
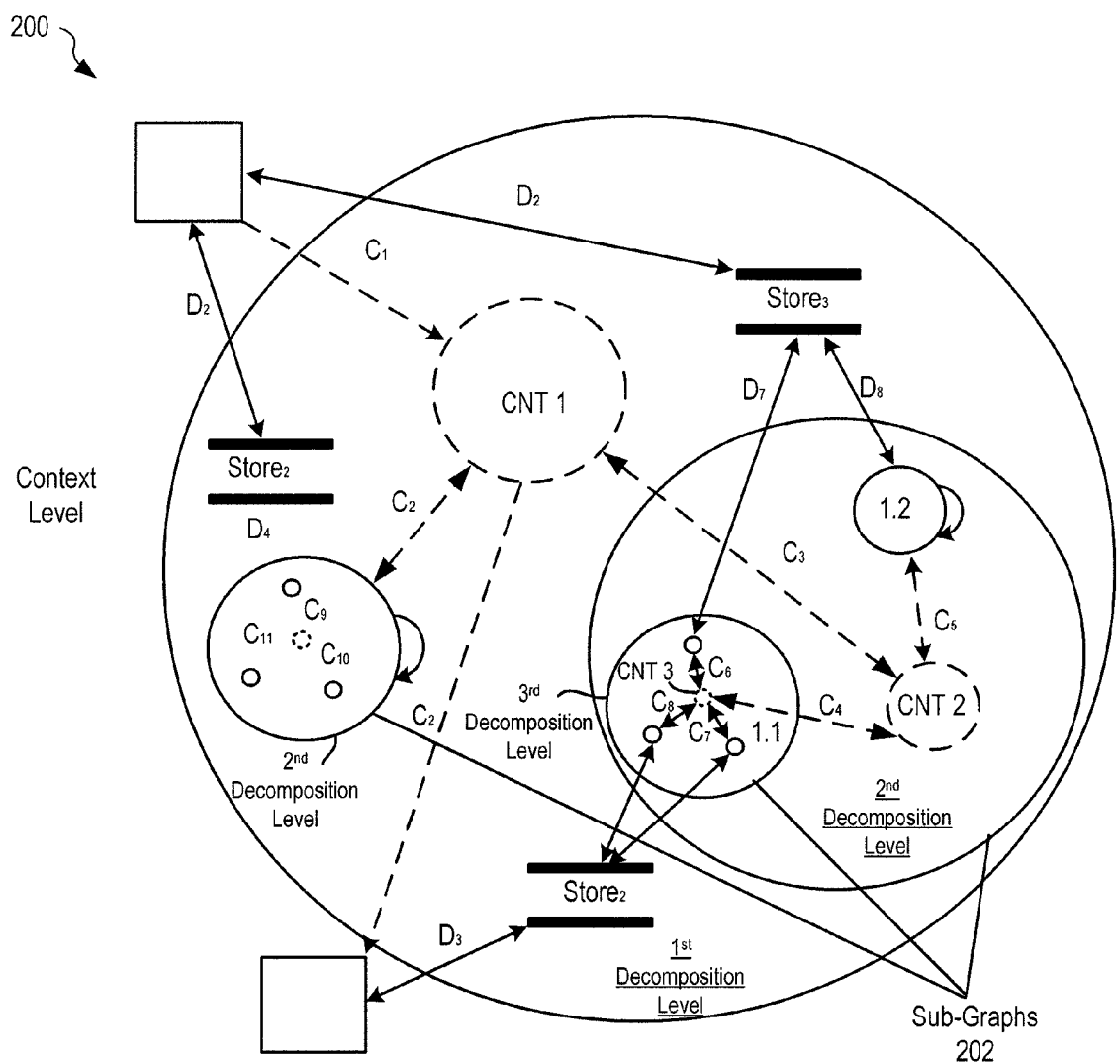
FIG. 2 shows one exemplary hierarchical decomposition graph that represents the software design of FIG. 1.

Development server 101 has a processor 106 and a memory 102 for storing a software design 110 and associated design representation 120. Software design 110 is based upon a massively parallel hierarchical design model that defines work from the most abstract level down to where code occurs. For example, software design 110 may be converted from non-hierarchical design model into a hierarchical decomposition software design using the concepts discussed in the Ser. No. 13/490,345 application incorporated by reference above. Design representation 120 may be a visual representation of software design 110 such as a decomposition graph, as illustrated in FIG. 2, or a global view, as illustrated in FIG. 3, or both.

Memory 102 also stores a design analyzer 108 that includes machine readable instructions that are executed by processor 106 to detect and/or restructure badly structured code within software design 110 as described below with reference to method 900 of FIG. 9. Design analyzer 108 may generate an unstructured indication 120 that indicates presence of unstructured code within software design 110. Optionally, design representation 120 along with indication 122 is displayed on one or more of display 152 on one or more developer computer 150.

The MPT Hierarchical Design model may be represented by the MPT Hierarchical Decomposition Graph. FIG. 2 shows one exemplary hierarchical decomposition graph 200 that represents software design 110 of FIG. 1. Each decomposition level contains one or more sub-graphs 202, one sub-graph for each decomposing process. Each sub-graph 202 may be considered a code snippet in the McCabe sense. As illustrated, there may be multiple levels of sub-graphs 202. For example a second decomposition level sub-graph may have a third decomposition level sub-graph within it. Note that a process that decomposes into a single lower-level process is invalid as no additional graph information is added. A process may decompose into a sub-graph with a minimum of two processes on it.

Figure 3:
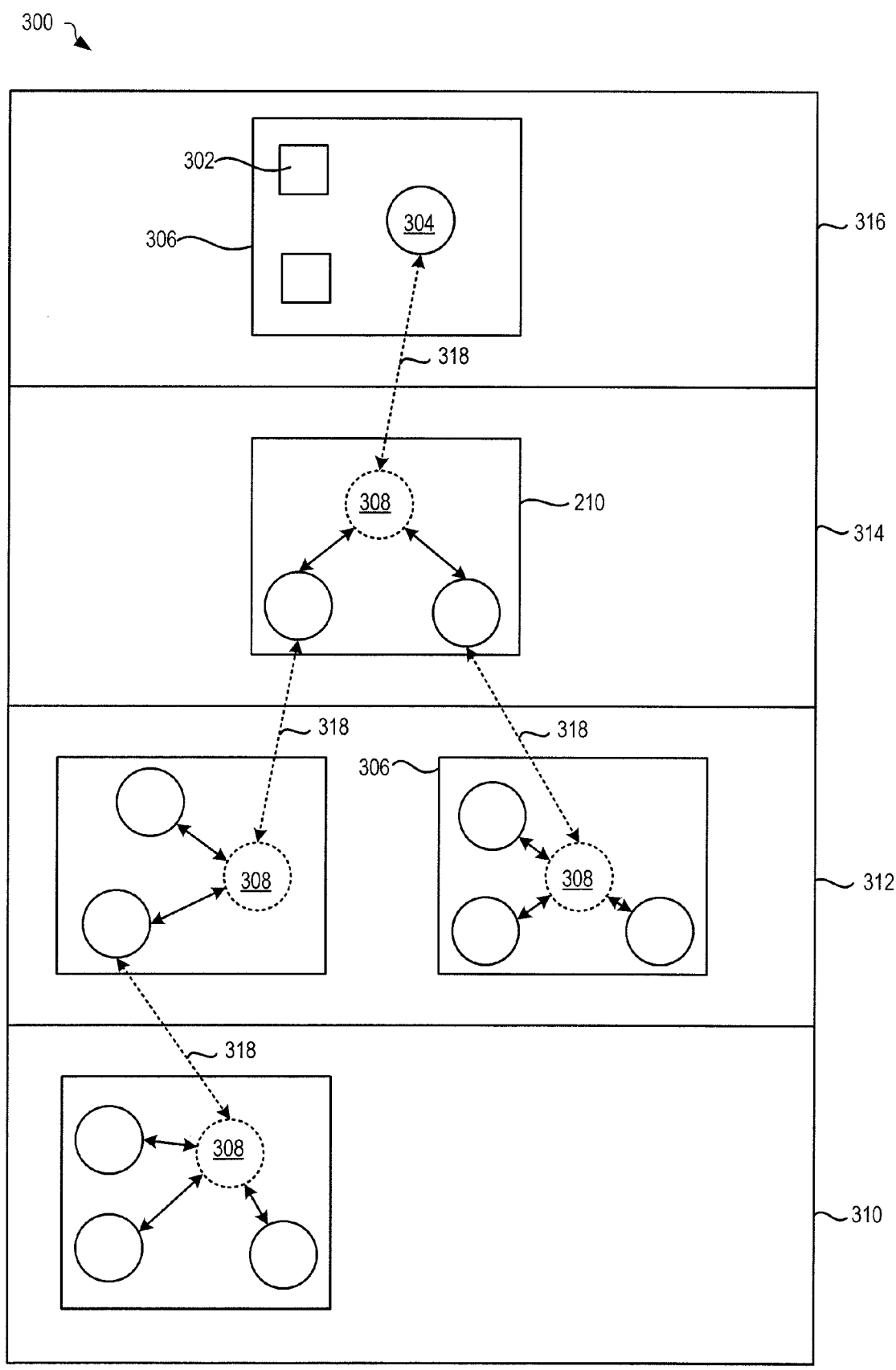
FIG. 3 shows one exemplary global view of the software design of FIG. 1.

FIG. 3 shows one exemplary global view 300 of software design 110. The global view shows the entire MPT Hierarchical Decomposition Graph at one time. The global view graphically shows control relationships among different decomposition levels, control relationships among different sub-graphs on the same decomposition level, and the control relationships among different processes on the same sub-graph.

Global view 300 includes terminators 302 (represented by solid small squares), processes 304 (represented by solid circles), sub-graphs 306 (represented by solid large squares), and control processes 308 (represented by dashed circles). Not all elements are labeled for clarity of illustration. Levels 310-316 represent decomposition levels. There may be multiple sub-graphs 306 on a level. A "Decomposition Path" 318 shows which process decomposes into which sub-graph. Since the MPT design graph is hierarchical, a full decomposition path represents a list of all of the processes required to go from the design Level-0 to the lowest possible design level.

Context Level Analysis

Figure 4:
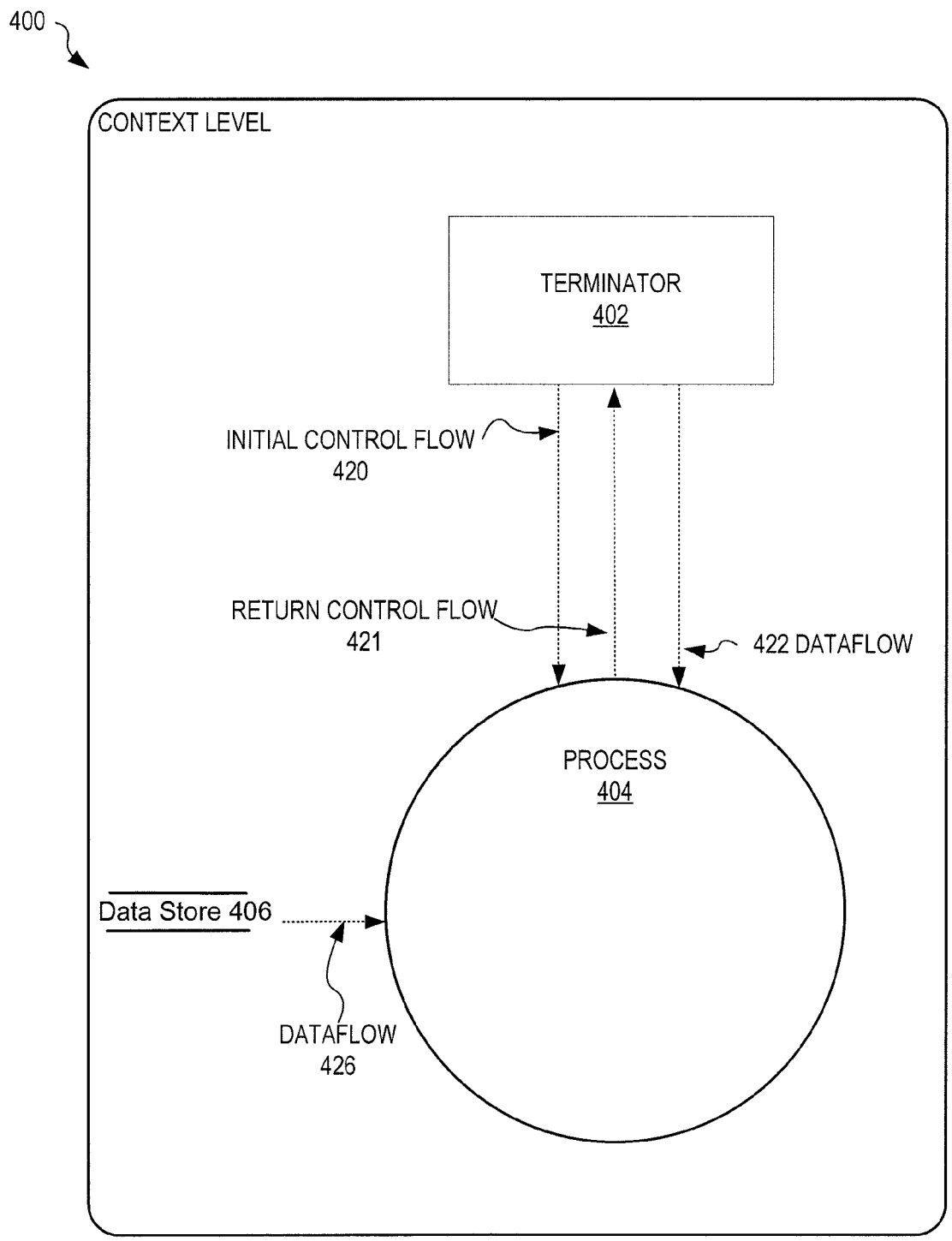
FIG. 4 shows one exemplary context level of an algorithm, in one embodiment.

FIG. 4 shows one exemplary context level 400 of an algorithm, in one embodiment. Context level 400 may be of software design 110, for example. Context level 400 includes a process 404, a terminator 402, and a data store 406. Process 404 may receive data from data store 406 and terminator 402 via data flow 426 and dataflow 422, respectively. Process 404 is also in communication with terminator 402 via initial control flow 420 and return control flow 421.

The algorithm's decomposition context level 400 is the only level of the decomposition where a decomposition process does not taken place. Exemplary methods 900-1200 of FIGS. 9-12, respectively, process the decomposed algorithm to determine if the algorithm's decomposition is well or ill formed.

Figure 5:
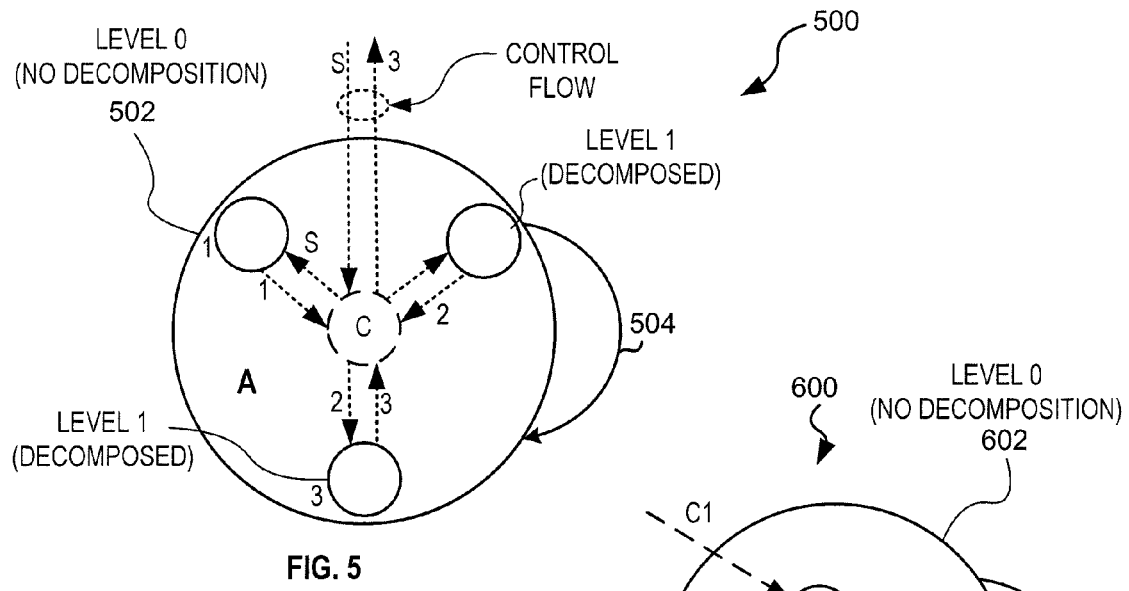
FIG. 5 shows one exemplary control flow associated transformation.

FIG. 5 shows one exemplary control flow associated transformation. The higher decomposition level 502 (e.g. level 0) is represented by the non-decomposed process. Attached to the non-decomposed process is a loop 504 (denoted by the large arced arrow). Because all of the decomposed processes are associated by a series of control-flows, the repeated activity indicated by the loop occurs between receiving the "S" and "3" control signals. That is, all decomposed processes are activated each time a loop is performed.

Figure 6:
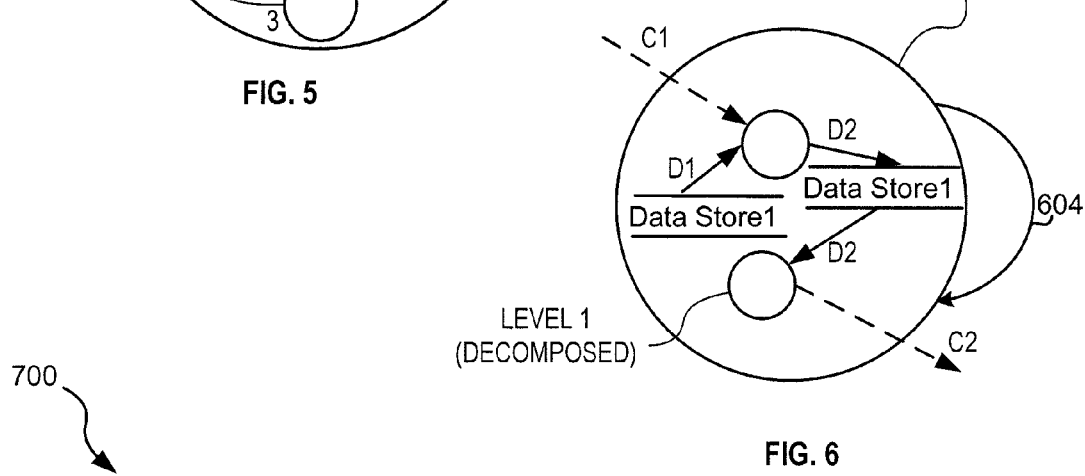
FIG. 6 shows one exemplary data flow associated transformation.

FIG. 6 shows one exemplary data flow associated transformation. The higher decomposition level 602 (level 0) is represented by the non-decomposed process. Attached to the non-decomposed process is a loop 604 denoted by the large arced arrow. Because all of the decomposed processes are associated by a dataflow repeated activity indicated by the loop occurs between receiving the D1 and D2 data. That is, all decomposed processes are activated each time a loop is performed.

Figure 7:
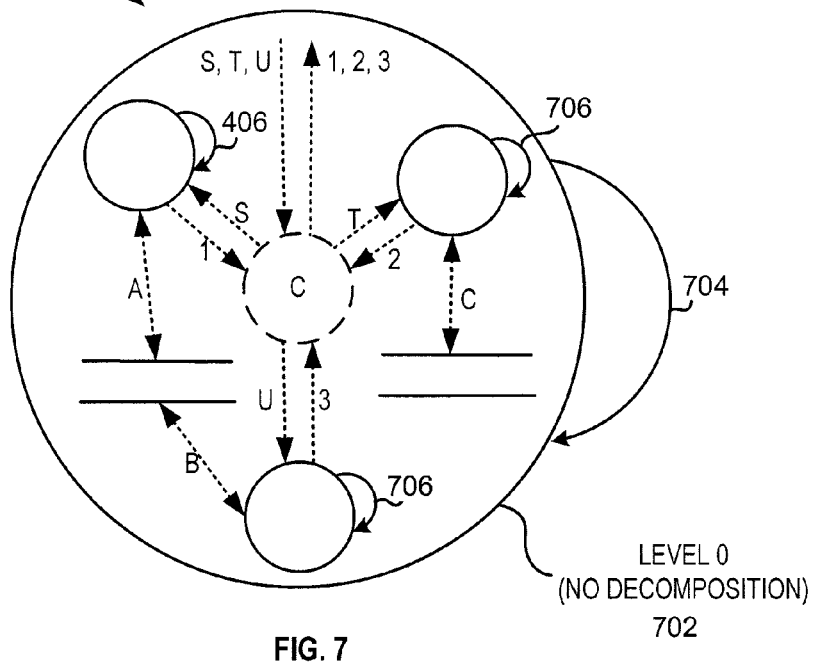
FIG. 7 shows one exemplary unassociated process with no sequencing between transformations and no shared data.

FIG. 7 shows one exemplary unassociated process 700 with no sequencing between transformations and no shared data. The higher decomposition level 702 (level 0) is represented by the non-decomposed process. Attached to the non-decomposed process is a loop 704 denoted by the large arced arrow. Because none of the decomposed processes found on level 1 are associated, they may be accessed individually. Therefore, the loop 704 depicted on level 0 is also depicted on level 1 (e.g. as loop 706). This is accomplished by attaching the level 0 loop to all level 1 processes.

Figure 8:
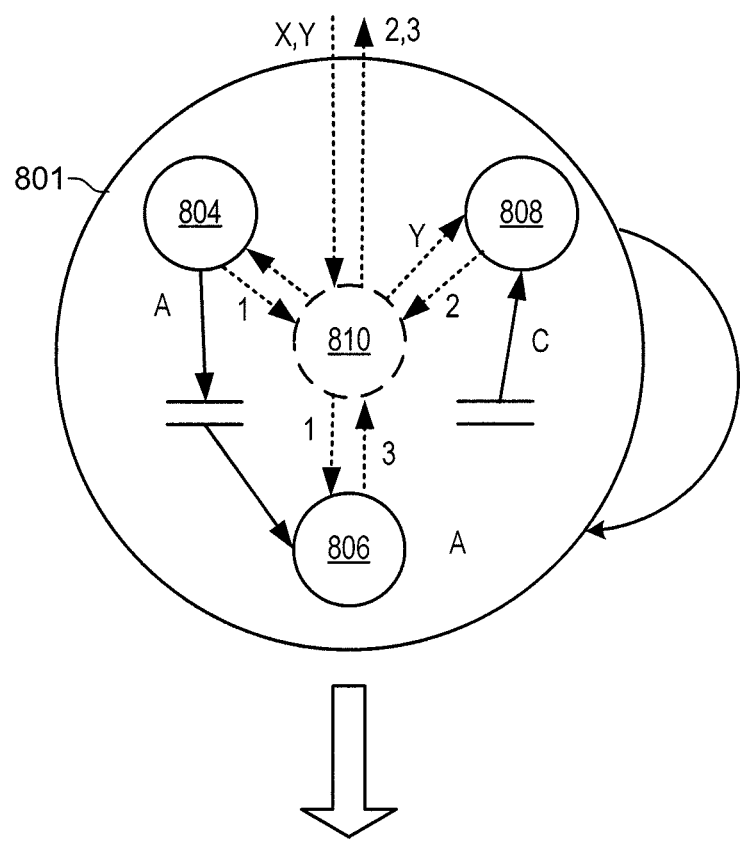
FIG. 8 shows one exemplary ambiguous process.
Figure 8:
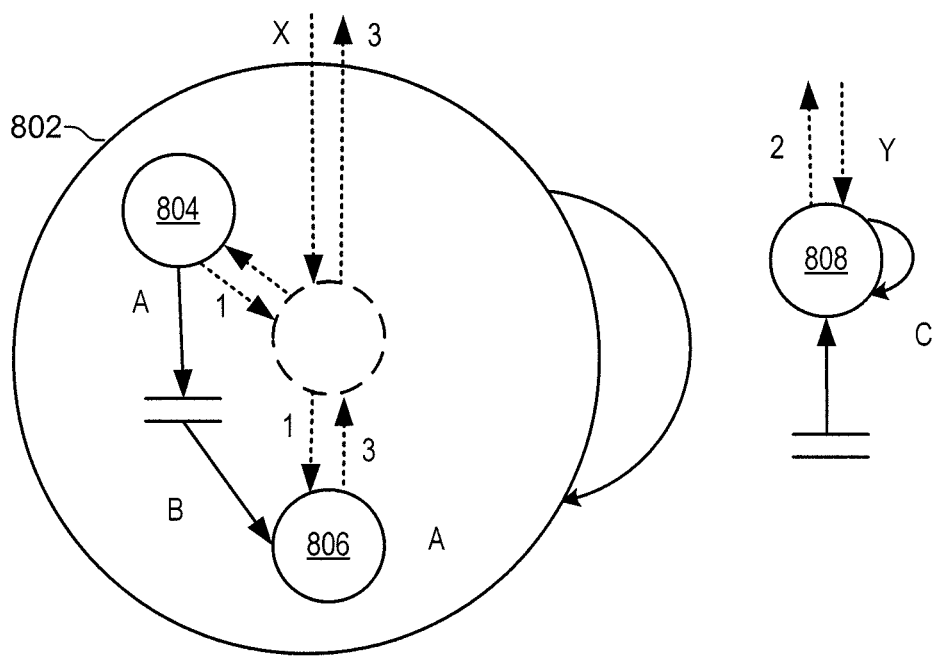

FIG. 8 shows one exemplary ambiguous process 801. Since an ambiguous process is one that decomposes into both associated (i.e. 804, and 806) and unassociated processes (i.e. 808), in order to properly understand how loops should be handled the ambiguous process must be converted into a non-ambiguous form. This is accomplished for example by using design analyzer 108 to extract the unassociated processes out of the ambiguous process and place them at the same level as the original undecomposed ambiguous process as illustrated by level 802. Furthermore, unassociated process 808 is extracted and brought out of level 802 as its own decomposed process. Each unassociated process receives the same looping structure as the original ambiguous process. An unassociated process is one that does not rely upon any information from another process. For example, process 808 receives dataflow Y, and returns as shown by arrow 3 in FIG. 8. Compared to processes 804 and 806, associated process are "associated" because process 806 is not run until after process 804 is executed (as shown by dataflow arrows labeled "1" in FIG. 8).

An associated process is a process that is associated with another process. For example, following the dashed arrows within ambiguous process 801, control 810 operates to execute process 804, and then execute process 806 once control flow returns (i.e. as illustrated by dashed arrow 1 going from process 804 to control 810). Accordingly, process 806 may not be executed until process 804.

Figure 9:
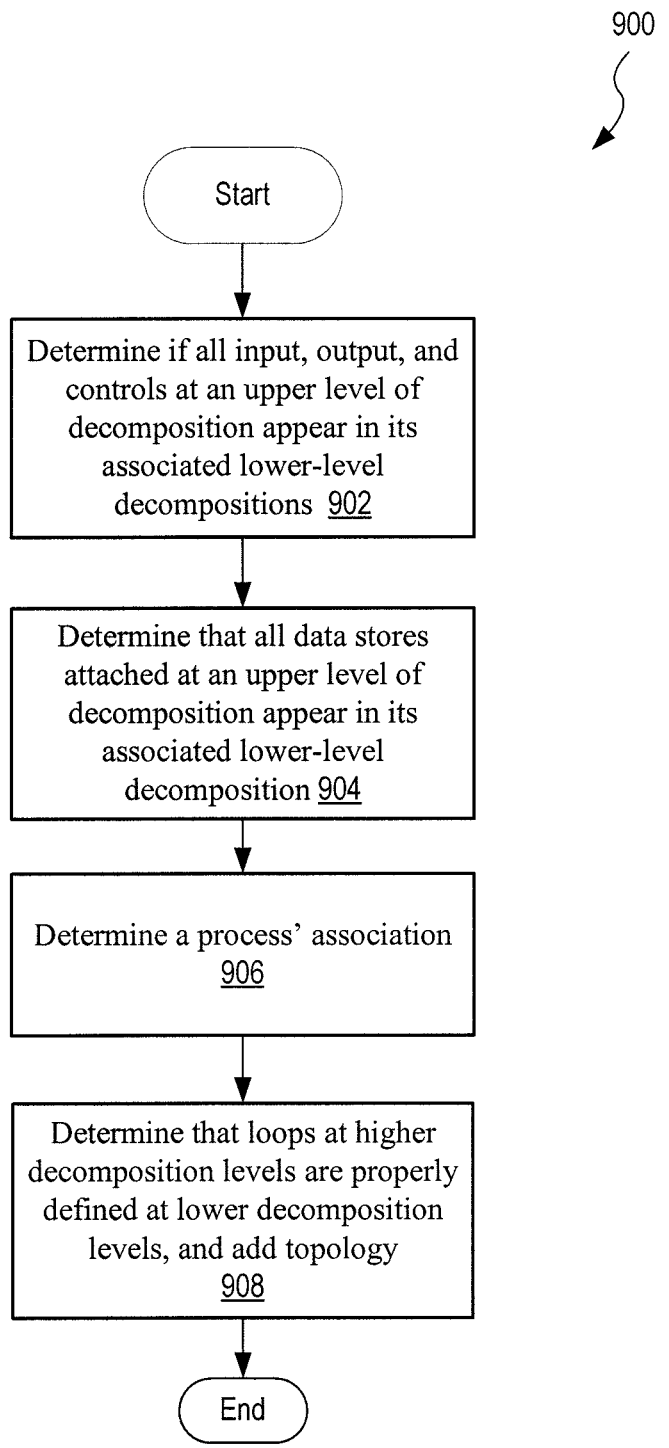
FIG. 9 shows an exemplary method for analyzing software design to determine decomposition structure, in one embodiment.

FIG. 9 shows an exemplary method 900 for analyzing software design to determine decomposition structure, in one embodiment. Method 900 is for example implemented within design analyzer 108.

In step 902, method 900 determines that all input, output, and controls at an upper level of decomposition appear in its associated lower-level decompositions. A more detailed understanding of step 902 may be found in method 1000, FIG. 10.

In step 904, method 900 determines that all data stores attached at an upper level of decomposition appear in its associated lower-level decomposition. A more detailed understanding of step 904 may be found in method 1100, FIG. 11.

In step 906, method 900 determines a process' association. A more detailed understanding of step 906 may be found in method 1200, FIG. 12.

In step 908, method 900 determines that loops at higher decomposition levels are properly defined at lower decomposition levels, and adds topology. A more detailed understanding of step 908 may be found in method 1200, FIG. 12.

Figure 10:
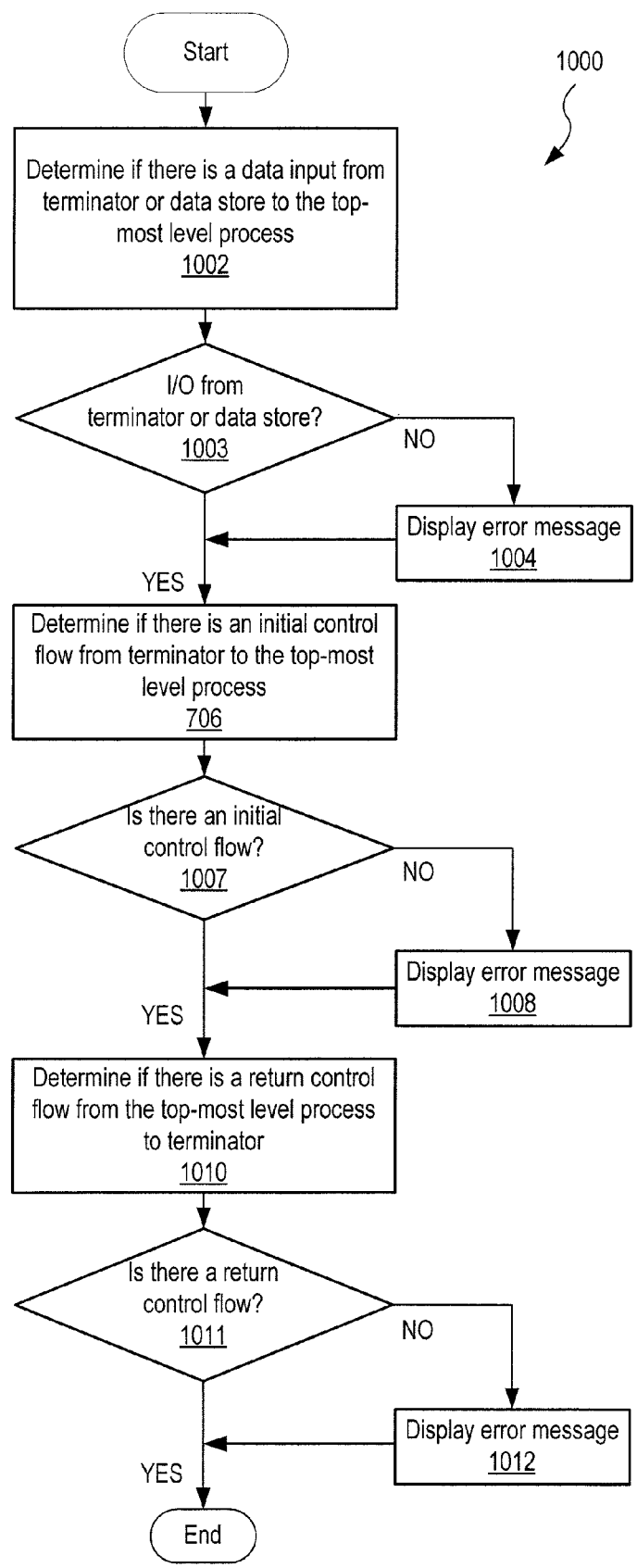
FIG. 10 shows an exemplary Context Level Analysis method for analyzing the context level, for example, the context level of FIG. 4, to determine if decomposition is well or ill formed.

FIG. 10 shows an exemplary Context Level Analysis method 1000 for analyzing the context level, for example, context level 400 of FIG. 4, to determine if decomposition is well or ill formed. Method 1000 is for example implemented within design analyzer 108.

In step 1002 method 1000 determines if there is a data input from a terminator or a data store to the top-most level process. For example, design analyzer 108 analyzes data flow 426 and dataflow 422 of level 400 (i.e. of software design 110) to determine whether data flow is proper. Dataflow is proper when there is input/output from the terminator or datastore to the process. Dataflow is improper when there is no input/output from the datastore or terminator to the process.

Step 1003 is a decision. If an input and/or output was found in step 1002, method 1000 moves to step 1006. If an input was not found in step 1002, method 1000 moves to step 1004, where an error message is displayed. Upon display of the error message in step 1004, method 1000 may return to step 1006. One example of an error message displayed in step 1004 is:

Error: process-name Must Have At Least One Input.

In step 1006 method 1000 determines if there is an initial control flow from terminator to the top-most level process. For example, design analyzer 108 determines whether an initial control flow 420 from terminator 402 to the top-most process 404 for proper control flow. Control flow is proper if there is an initial control flow input to the top-most process (i.e. process 404).

Step 1007 is a decision. In step 1007, method 1000 determines if an initial control flow was found in step 1006. If an initial control flow was found, method 1000 moves to step 1010. If an initial control flow was not found in step 1006, method 1000 moves to step 1008 where an error message is displayed. After display of the error message, method 1000 may return to step 1010. One example of an error message displayed in step 1008 is:

Error: process-name Must Have an Initial Control Flow.

In step 1010 method 1000 determines if there is a return control flow from the top-most level process to the terminator. For example, design analyzer 108 determines if return control flow 421 from process 404 to terminator 402 is present, thereby having proper control flow. If there is no return control flow 421 from the top-most level process 404 to terminator 402 then the decomposition is ill formed.

Step 1011 is a decision. If in step 1011, method 1000 determines a return control flow was found in step 1010, method 1000 terminates and returns to step 904 of method 900. If no control flow was found in step 1010, method 1000 moves to step 1012, where an error message is displayed. Upon display of the error message in step 1012, method 1000 may terminate and return to step 904 of method 900. One example on an error message displayed in step 1012 is:

Error: Process-name Must Have At Least One Return Control Flow

Non-Context Level Analysis

Figure 11:
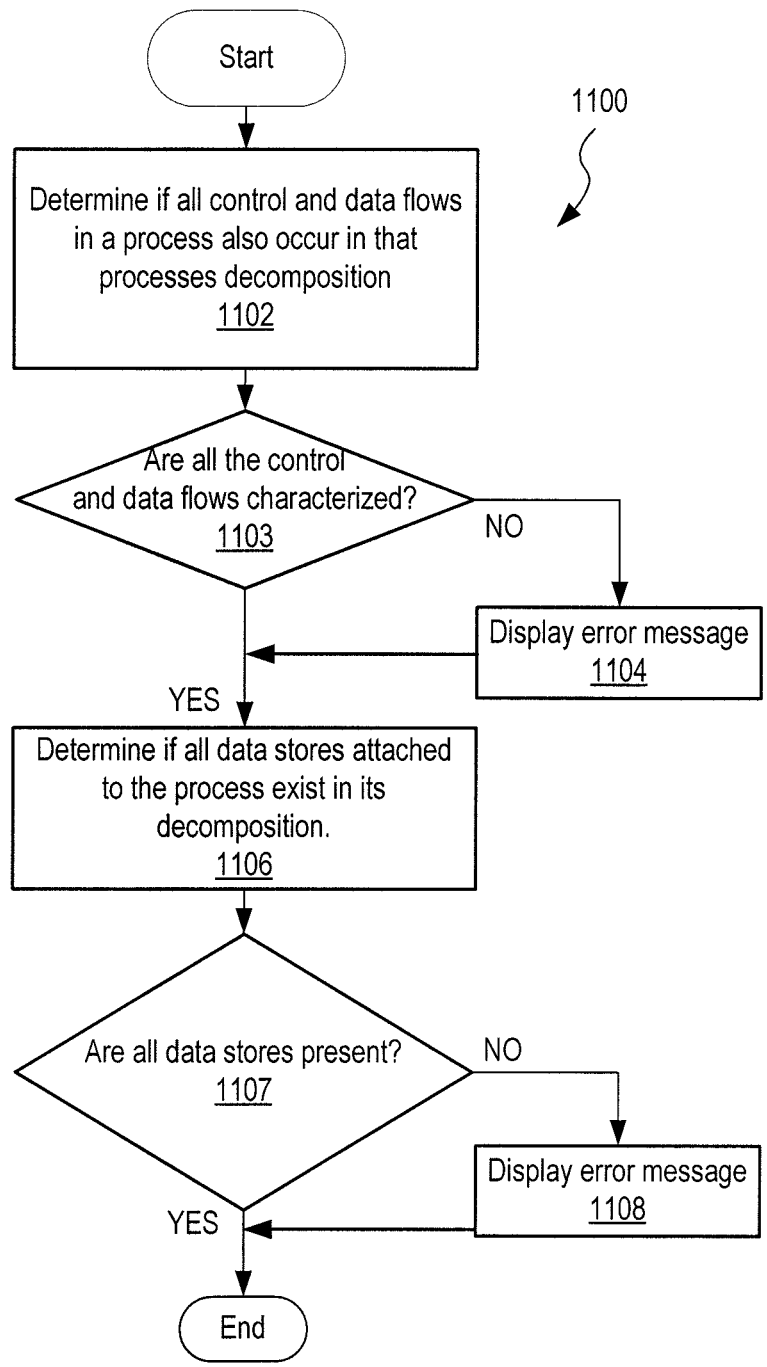
FIG. 11 shows one exemplary non-context level analysis method, in one embodiment.

FIG. 11 shows one exemplary non-context level analysis method 1100, in one embodiment. Method 1100 is for example implemented by design analyzer 108.

In step 1102 method 1100 determines if all control and data flows found attached to a process within a first decomposition level (e.g. decomposition level 314) also are characterized in a lower decomposition level (e.g. decomposition level 312) associated with that particular process. For example, design analyzer 108 analyzes software design 110 to determine dataflow and/or control flow (e.g. dataflow 420-426) to and from a particular process occurs in one decomposition (e.g. second decomposition level), and then compare that dataflow to a lower level decomposition (e.g. third decomposition level) representing the same process.

Step 1103 is a decision. In step 1103 method 1100 determines if all the control and data flow from step 1102 are properly characterized in each respective decomposition level. If all the control and data flows are properly characterized, method 1100 moves to step 1106. In all the control and data flows were not found in step 1102, method 1100 moves to step 1104, where an error is displayed. Upon display of the error message in step 1104, method 1100 may proceed with step 1106. Two examples of an errors displayed in step 1104 are:

Error: Missing the following Control Flow Names: flow$_1$, flow$_2$, ..., flow$_n$ Error: Missing the following Data Flow Names: flow$_1$, flow$_2$, ..., flow$_n$ In step 1106, method 1100 determines if all data stores, for example data storage 406, found attached to a process also occur in that processes decomposition. For example, design analyzer 108 determines, via processor 106, any datastores (i.e. datastore 406) to which dataflow interacts with a process, and then determines whether that datastore is represented in the lower level decomposition.

Figure 12:
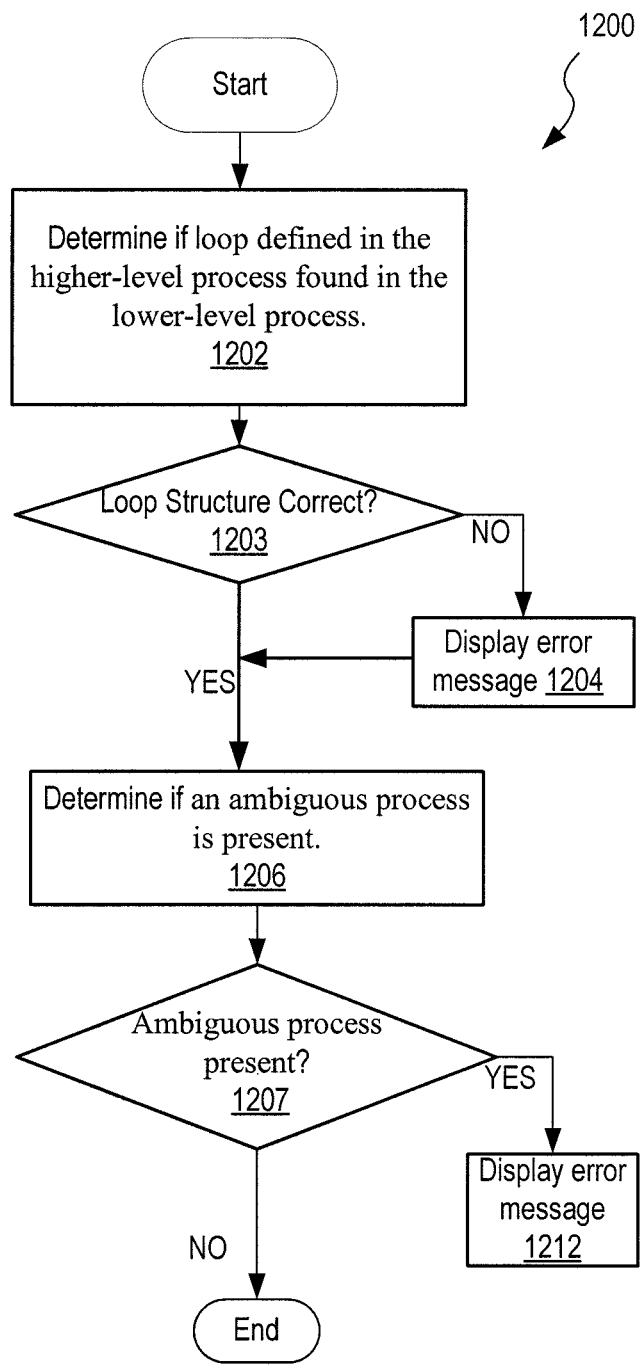
FIG. 12 shows one exemplary association analysis method for determining errors in associated processes.

Step 1107 is a decision. If, in decision step 1107, method 1100 determines all data stores were found in step 1106, method 1100 proceeds with step 906 and/or 908 of method 900 of FIG. 9. If all the data stores were not found in step 1106, then method 1100 moves to step 1108, where an error message is displayed. Upon display of the error message in step 1108, method 1100 may proceed with step 906 and/or 908. One example of an error message displayed in step 1108 is:

Error: Missing the following Data Store Names: flow$_1$, flow$_2$, ..., flow$_n$ Association Analysis FIG. 12 shows one exemplary association analysis method 1200 for determining errors in associated processes. For example, method 1200 is implemented within design analyzer.

Associated processes automatically form a multiple process loop beginning with a process or transformation associated with an initialization control and ending with the process or transformation associated with an exiting control. Method 1200 insures that a loop defined in the higher-level process is not found in the lower-level process if the processes are associated.

In step 1202 method 1200 analyzes looping structure of a first decomposition level (e.g. decomposition level 314) and looping structure of a second decomposition level associated with a particular process within the first decomposition level to determine if a loop defined in the first level process is found in lower-level process.

Step 1203 is a decision. If, in step 1203, method 1200 determines if the looping structure is correct (i.e. the looping structure of the first decomposition level is characterized in the associated second decomposition level), method 1200 proceeds with step 1206. If the looping structure is not correct (i.e. the looping structure of the first decomposition level is not characterized in the associated second decomposition level), method 1200 proceeds to step 1204, where an error message is displayed. Upon display of the error message in step 1204, method 1200 may proceed with step 1206. Two examples of an error message is displayed in step 1204 are as follows:

Error: process-name improperly contains a loop from the higher level decomposition.

Error: process-name requires the loop described in the upper level to appear on this object In step 1206 method 1200 determines if an ambiguous process is present. An ambiguous process is one whose decomposition contains both associated and unassociated processes. For example, design analyzer 108 may analyze the control flow within a decomposition level to determine if a first process requires a second process to be executed before execution of the first process.

Step 1207 is a decision. If, in step 1207, method 1200 decides if an ambiguous process was found in step 1206. If an ambiguous process is present, method 1200 moves to step 1208, where an error message is displayed. Upon display of error message in step 1208, method 1200 terminates. One example of an error message displayed n step 1212 is:

Error: process-name should be moved up one decomposition level.

If no ambiguous process is found, method 1200 ends.

Restructuring Code:

To have a well formed decomposition, ambiguous processes should be changed such that the associated processes may be found at the lower-level decomposition and the unassociated processes may be found at the upper-level decomposition. In one embodiment, the present system and method automatically changes ambiguous processes such that the associated processes may be found at the lower-level decomposition and the unassociated processes may be found at the upper-level decomposition.

Figure 13:
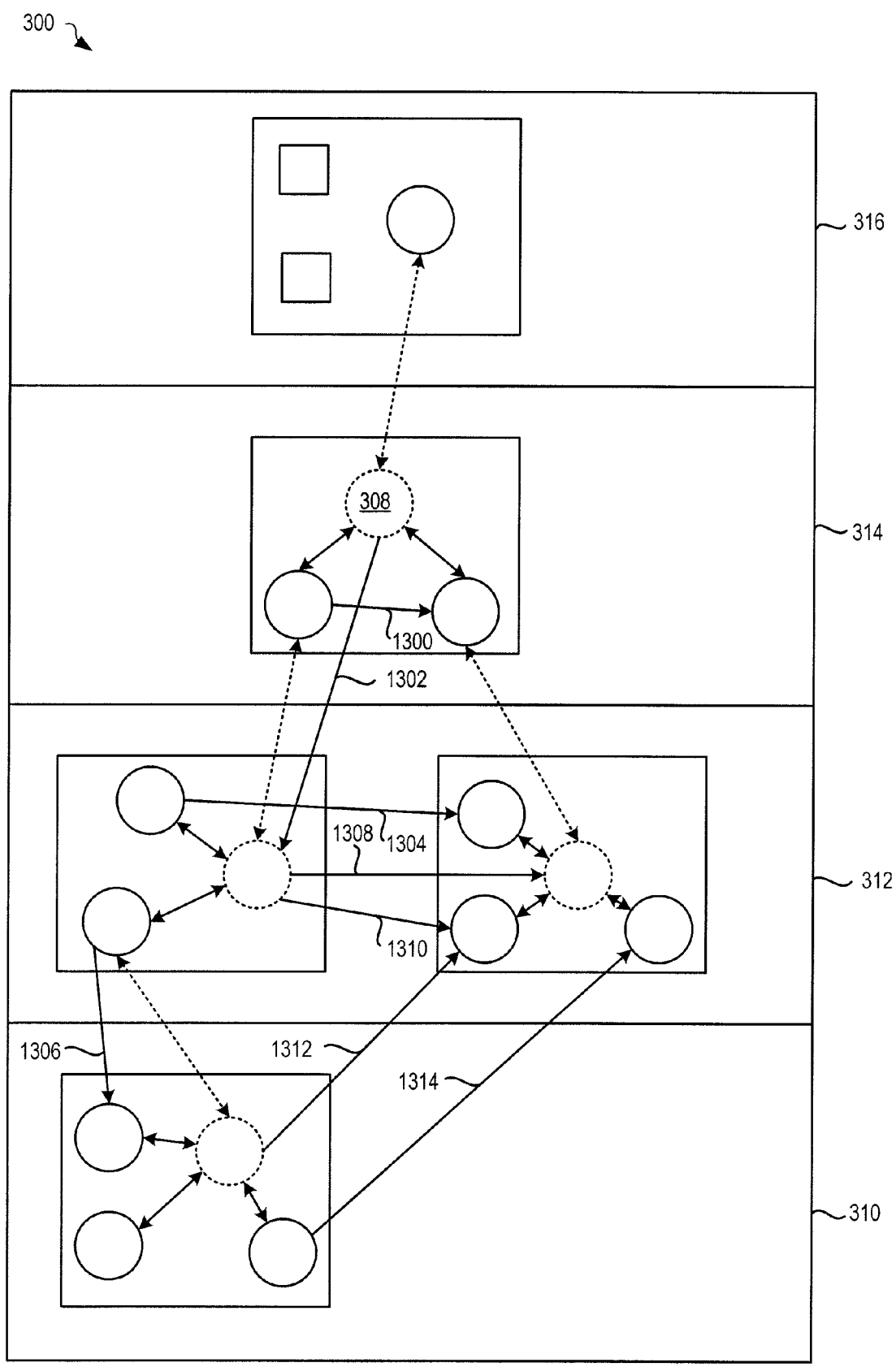
FIG. 13 shows the global view of FIG. 3 including eight exemplary improper control flows in which an information indicator will be detected and generated by the design analyzer of FIG. 1.

FIG. 13 shows global view 300 including eight possible improper control flows 1300-1314 in which an information indicator 122 will be detected by design analyzer 108.

Improper control flow 1300 occurs when control flow is flowing from one process kernel to another process kernel within the same sub-graph. Control flow can only flow between a control kernel and either a terminator or a process kernel.

Improper control flow 1302 occurs when control flow flows from one control kernel to another control kernel within a different sub-graph on a different decomposition level.

Improper control flow 1304 occurs when control flow flows from one process kernel to another process kernel within a different sub-graph on the same decomposition level.

Improper control flow 1306 occurs when control flow flows from one process kernel to another process kernel within a different sub-graph on a different decomposition level.

Improper control flow 1308 occurs when control flow flows from one control kernel to another control kernel within a different sub-graph on the same decomposition level.

Improper control flow 1310 occurs when control flow flows from one control kernel to a process kernel within a different sub-graph on the same decomposition level.

Improper control flow 1312 occurs when control flow flows from one control kernel to a process kernel on a different sub-graph on a higher decomposition level.

Improper control flow 1314 occurs when control flow flows from one process kernel to a process kernel on a different sub-graph on a higher decomposition level.

Improper control flows 1300-1314 represent badly structured code. Badly structured code is undesirable because it is unstructured, that is it represents code that cannot be arrived at using any functional decomposition model. To detect whether an improper control flow is present, design analyzer 108 analyzes software design 110 and determines whether one or more of the situations illustrated by improper control flows 1300-1314 is present. If one of improper control flows 1300-1314 is present, design analyzer 108 may generate unstructured indication 122 and display the indication, and associated portion of the design representation 120 on display 152. Additionally, unstructured indication 122 may include a description or indication of what improper control flow is present.

Because there is a finite number of unstructured control flows (i.e. eight), as discussed above with reference to FIG. 13, it is possible for design analyzer 108 to convert badly structured code into well-structured code. As will be discussed below, conversion is performed differently for each indicator.

Figure 14:
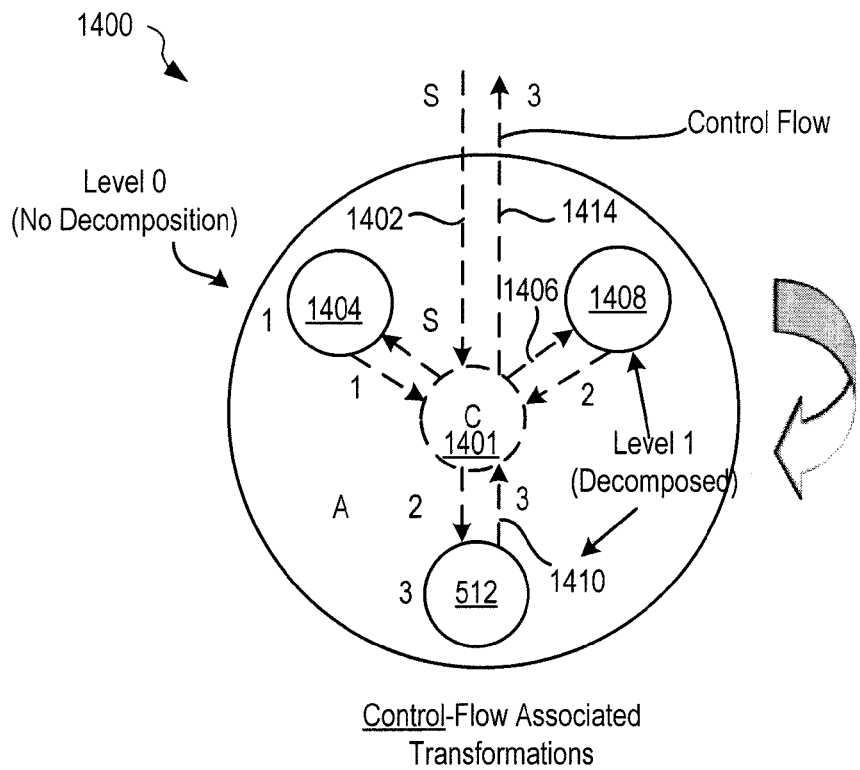
FIG. 14 shows an exemplary control flow associated process.
Figure 15:
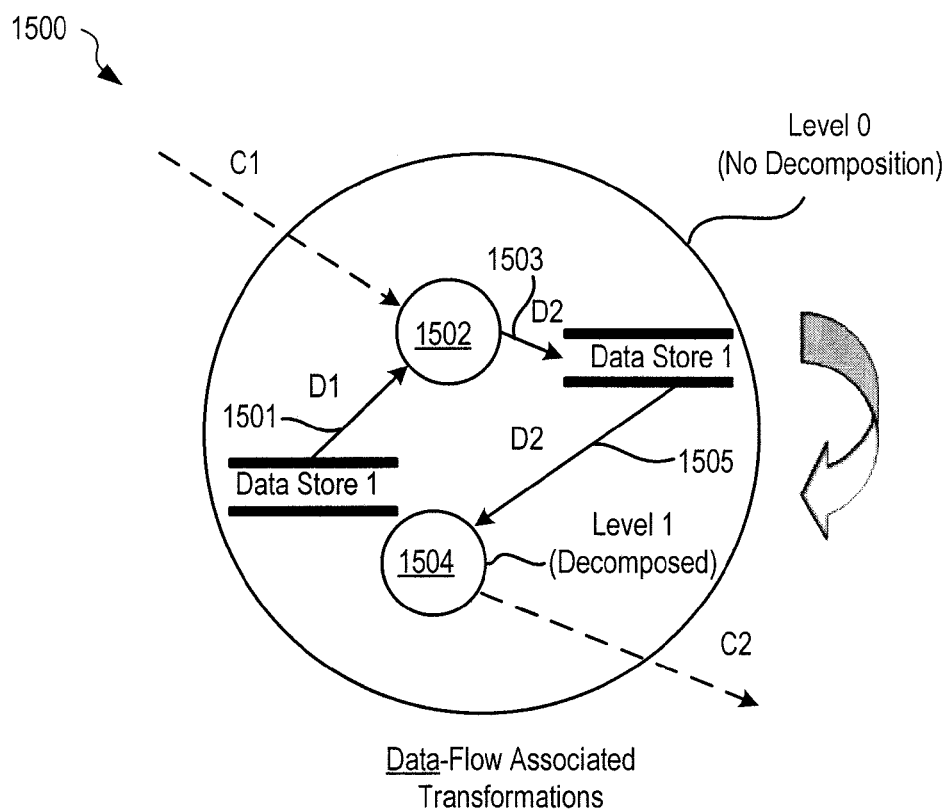
FIG. 15 shows an exemplary data flow associated process.

FIG. 14 shows exemplary control flow associated process 1400. FIG. 15 shows an exemplary data flow associated process 1500. Associated processes, i.e. either control or data associated, automatically form a multiple-process loop beginning with the transformation associated with the initialization control kernel and ending with the process associated with the exiting control. For example, as illustrated in FIG. 14, loop starts with transformation "s" 1402 which executes process 1404. Then, upon return to control 1401 from process 1404, the loop continues with transformation 1406 to execute process 1408. Upon return to control 1401, loop continues with transformation 1410 to execute process 1412, and then exits control flow process 1400 through transformation 1414. Note that in FIG. 14, each transformation (i.e. dashed arrows) is ordered such that control 1401 sequentially executes each associated process.

As illustrated in FIG. 15, dataflow associated transformations occur when data must be obtained from a datastore (or other element) prior to executing a second process or other element. For example, in FIG. 15, process 1504 is not executed until process 1502 receives dataflow 1501 from datastore 1, is executed, and then transfers dataflow 1503 to datastore 1. Only then may process 1504 receive dataflow 1505 and be executed.

Figure 16:
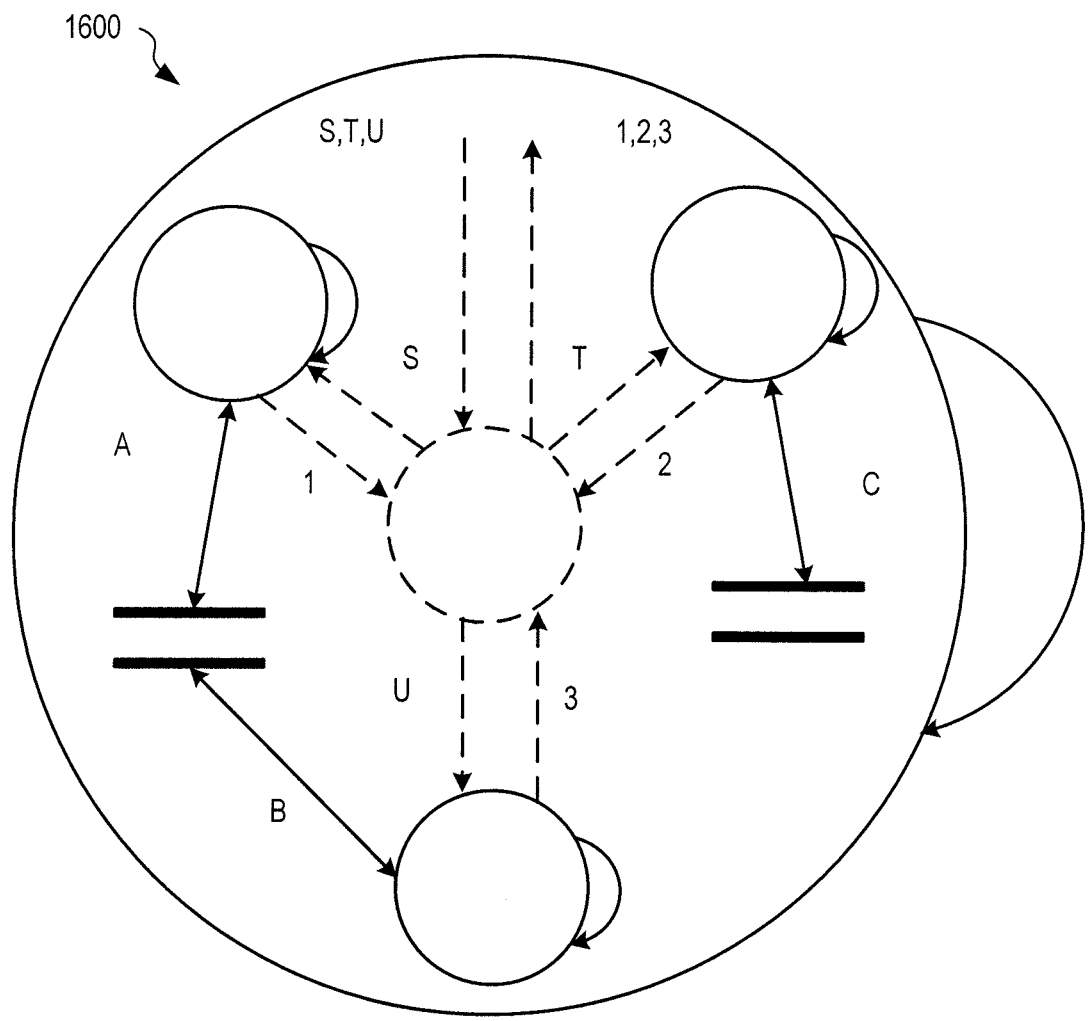
FIG. 16 depicts an exemplary unassociated non-control process.

FIG. 16 depicts an exemplary unassociated non-control process 1600 Unassociated non-control processes each automatically take on the looping structure of the higher-level decomposition process.

Figure 17:
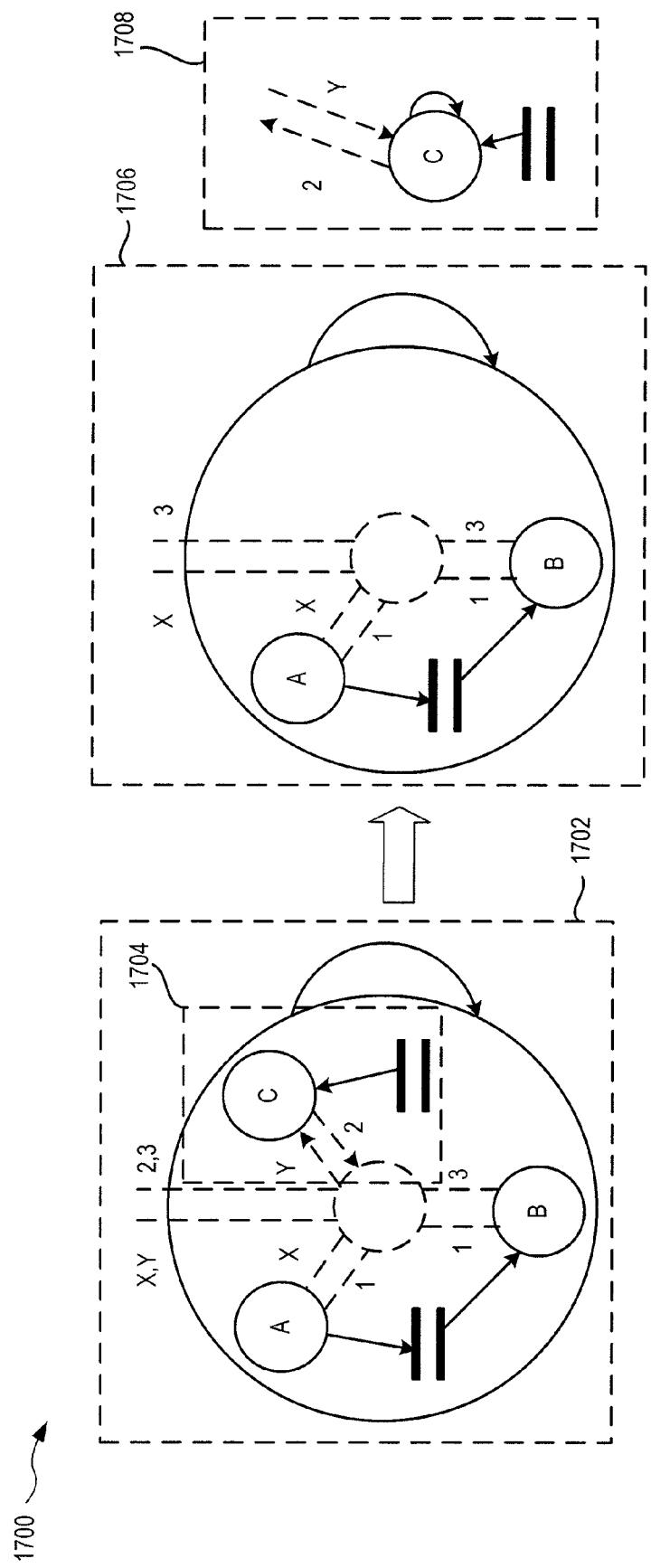
FIG. 17 shows an exemplary restructuring of ambiguous non-control process equivalents, in one embodiment.

FIG. 17 shows an exemplary restructuring 1700 of ambiguous non-control process equivalents. For example, ambiguous non-control processes may be changed such that the associated processes are at lower-level decomposition and the unassociated ones are placed on the upper level decomposition. In one embodiment, if design analyzer 108 detects an ambiguous non-control process, i.e. a process which does not have a consecutive looping structure based upon the order of dataflow, design analyzer 108 automatically restructures the design to place the ambiguous portion of the software design 110 into a lower decomposition level. For example, in FIG. 17, ambiguous non-control process 1702, having unassociated portion "C" 1704, may be restructured into a first and second decomposition levels 1706, 1708, respectively. Wherein design analyzer 108 restructures the software design (i.e. software design 110) such that the associated portions of ambiguous process 802 are located in first decomposition level 806 and unassociated portion 804 is located in second, lower, decomposition level 808.

Figure 18:
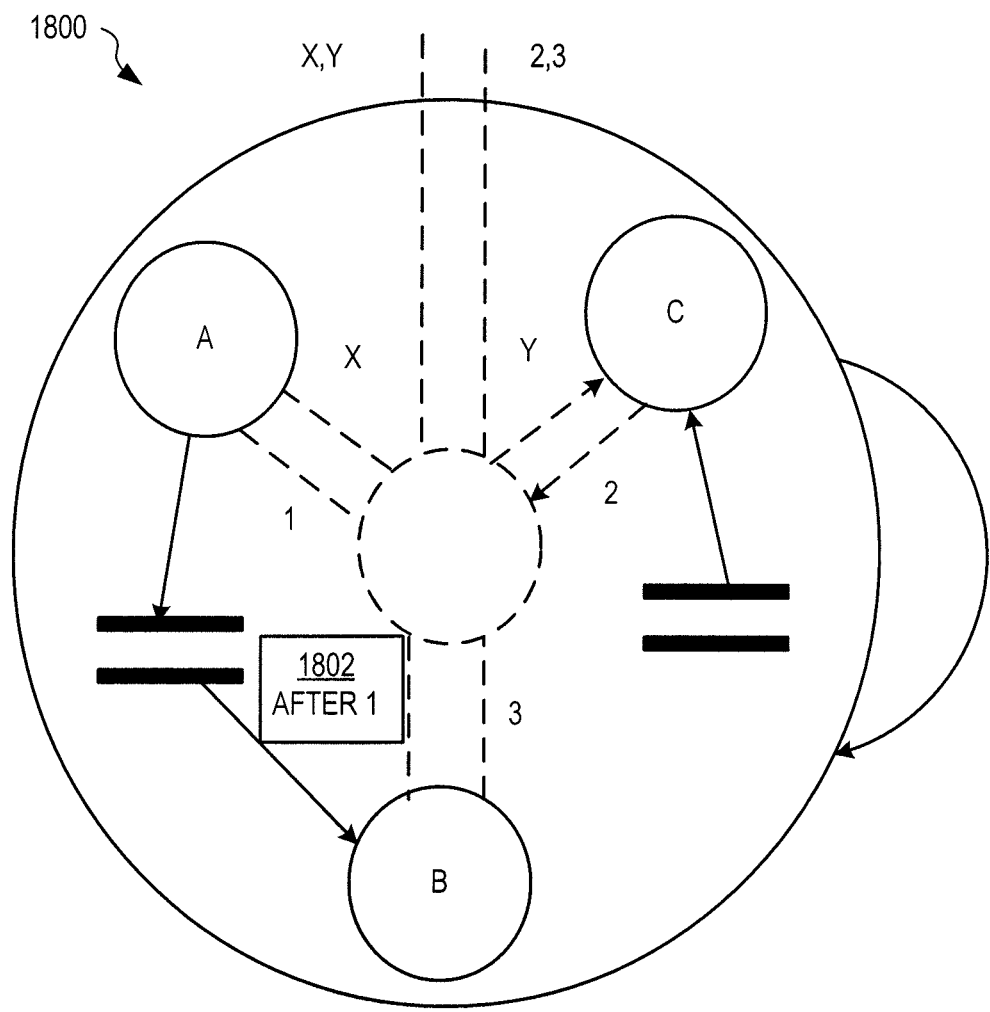
FIG. 18 shows an exemplary non-control process with association indicator.

In one embodiment, design analyzer 108 may restructure software design using dataflow association indicators. FIG. 18 shows an exemplary non-control process with association indicator 1800. For example, design analyzer 108 may generate association indicator 124 to be displayed along with design representation 122. In the example shown in FIG. 18, association indicator 1804 denotes "after1". In an MPT Hierarchical Decomposition Graph (i.e. design representation 122), process association is identified using special control-flow indicator "after" followed by the flow name. This changes the invoking dataflow of "B" as illustrated in FIG. 18.
Type 1 Restructuring:

As discussed above with reference to FIG. 13, there may be eight types of improper dataflows. Type 1 badly structured code is where one McCabe linear independent path directly calls another McCabe linear independent path in the same sub-routine, without decomposition. This is illustrated by improper dataflow 1300 of FIG. 13. The following code is an example of a pseudo-code snippet which exhibits type-1 poor structuring behavior:

```
Code Snippet 1: Type-1 Poor Structuring Behavior:

Main( )
{
        int a=1;
    entrypoint:
            McCabe independent path one
            if (a>1)
            {
            ...
            McCabe independent path two
            goto exitpoint;
            }
            McCabe independent path three
            goto entrypoint;
    exitpoint:
            McCabe independent path four
}
```

Figure 19:
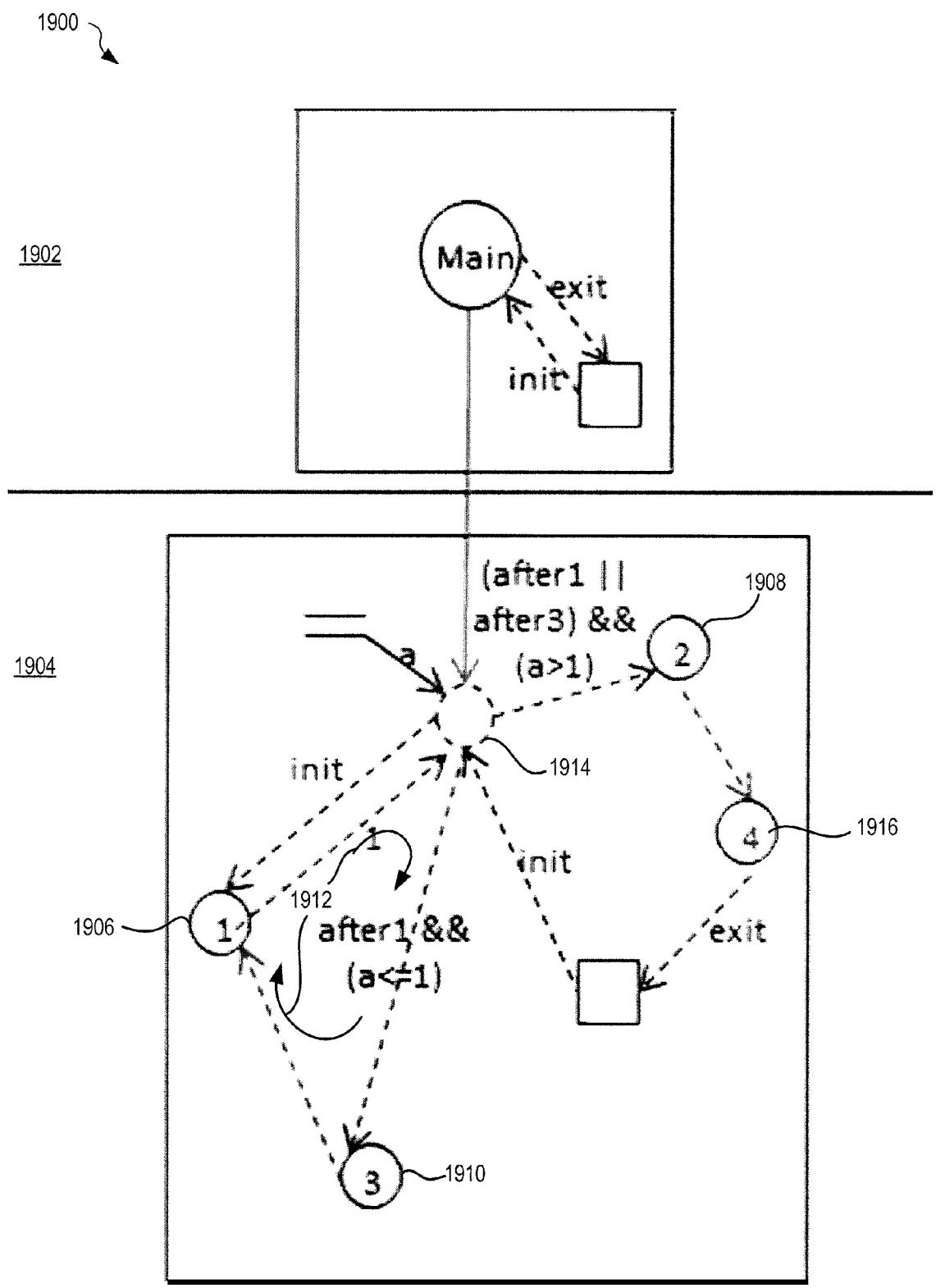
FIG. 19 shows an exemplary global view of type-1 poor structuring code of Code Snippet 1.

FIG. 19 shows an exemplary global view 1900 of type-1 poor structuring code of Code Snippet 1. Global view 1900 illustrates an upper and lower decomposition levels 1902 and 1904, respectively. In level 1904, processes 1906, 1908 and 1910 are associated. Examination of level 1904, for example by design analyzer 108, would determine a cycle 1912 created by process 1906, control 1914, and process 1910.

There are two improper control flows in FIG. 19. Improper control flow 1916 from process 1910 to process 1906, and improper control flow 1918 from process 1908 to process 1920. Cycle 1912, created because of improper control flow 1916, is continuous and thus, can be converted into a loop. The loop-ending criteria is the inverse of the non-association symbols of the last associated loop process. For example, the inverse of the last non-associated symbols of the last associated loop process of improper control flow 1916 is "after3".

Figure 20:
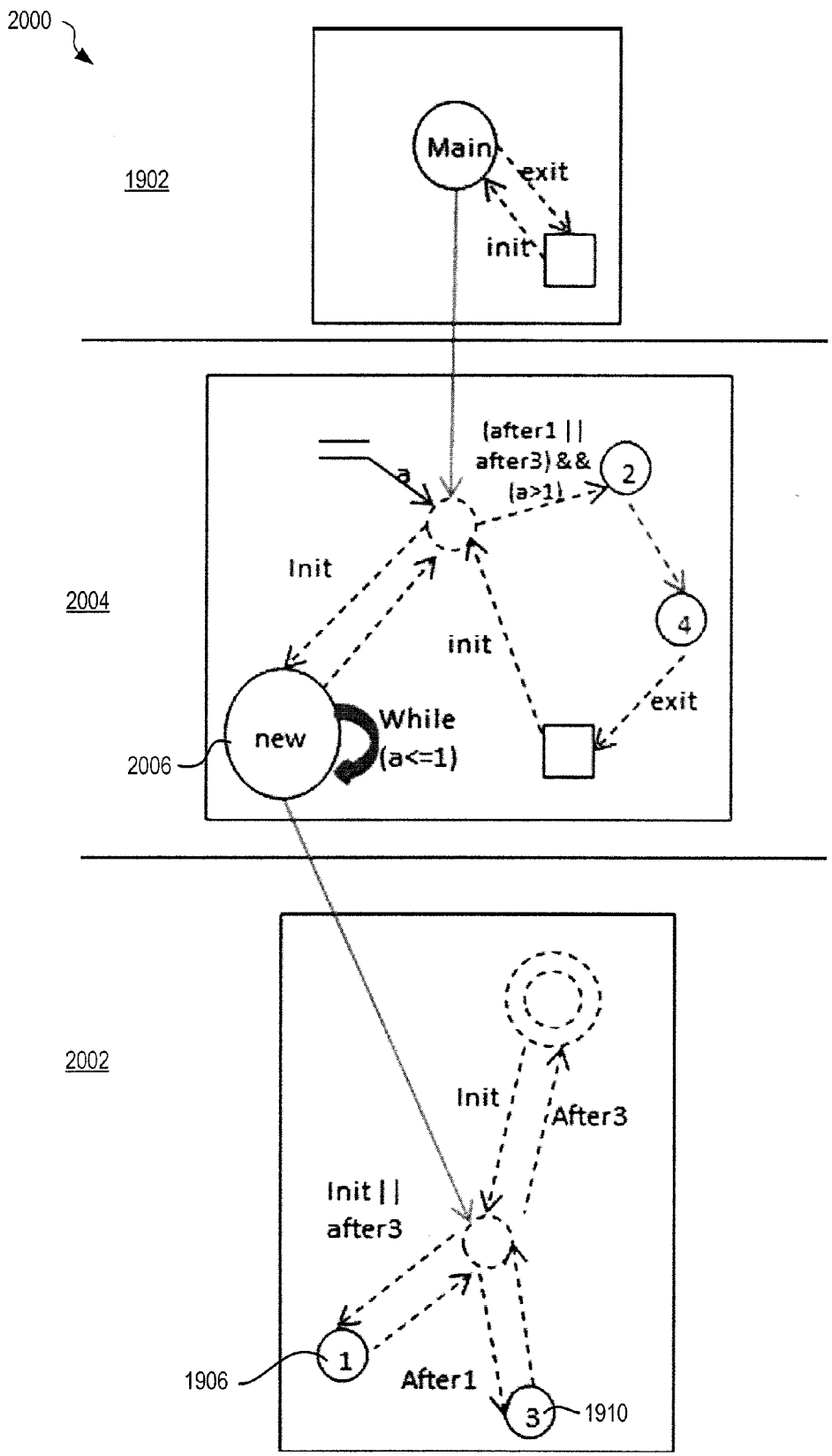
FIG. 20 illustrates an exemplary restructured graph restructuring the control flow of FIG. 19, in one embodiment.

FIG. 20 illustrates a restructured graph 2000 restructuring control flow 1916. For example, design analyzer 108 updates graphical representation 122, as well as software design 110, to create a new decomposition level 2002 and updated decomposition level 2004. Processes 1906 and 1910 are now relocated to decomposition level 2002 having a corrected control flow. New process bubble 2006 now represents previous processes 1906, 1910.

Figure 21:
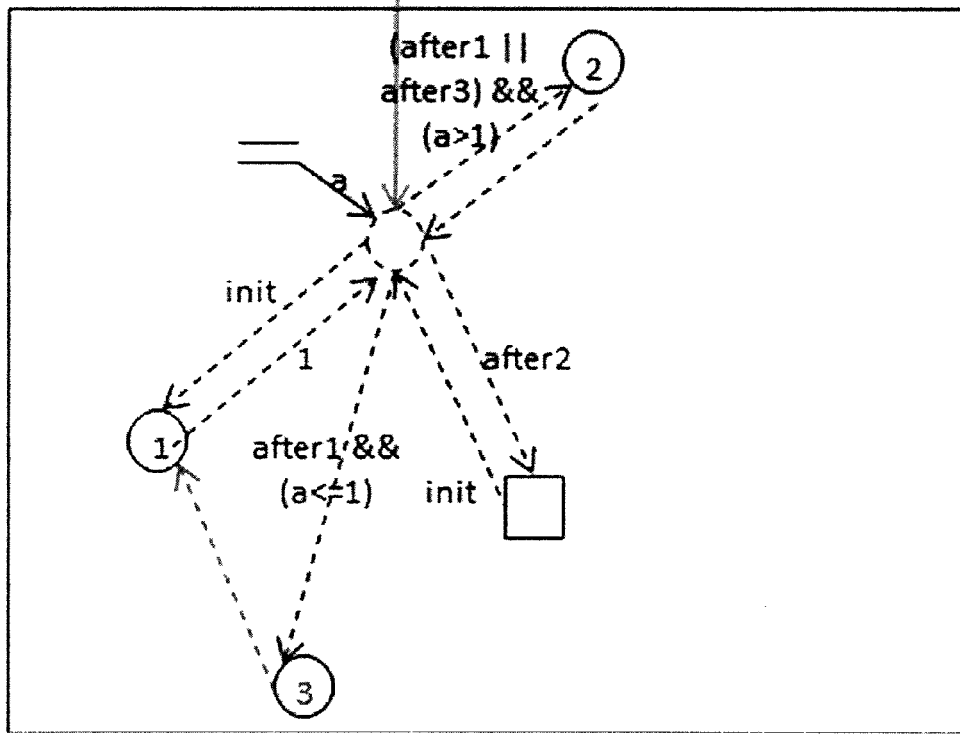
FIG. 21 illustrates another exemplary restructured graph restructuring the control flow of FIG. 21, in an alternate embodiment.

Referring back to FIG. 19, improper control flow 1918 is not cyclic. Accordingly, the software design and graphical representation may be restructured in a simpler manner. For example, design analyzer 108 may remove process 1916 and restructure the transformation flows as illustrated in FIG. 21. Accordingly, restructured graph 2100 will show an updated decomposition level 2102 without process 1916.

Type-2 Restructuring:

Type-2 poorly structured code is control flow flowing from one control kernel to another control kernel. For example, type-2 poorly structured code is similar to improper control flow 1302 of FIG. 13. Code Snippet 2 below is an exemplary pseudo-code snippet which exhibits type-2 poor structuring behavior.

Code Snippet 2: Type-2 Poor Structuring Behavior:

```
Main( )
{
    int a=1;
start:
    McCabe independent path one
    subroutine1( ):
}
Subroutine1( )
{
    McCabe independent path two
    goto start;
}
```

The type-2 poor structuring behavior will not compile, and is therefore a condition that will never occur. Accordingly, no change is required. In one example of operation of system 100. Design analyzer 108 determines a type-2 poor structure within software design 110. In response, design analyzer 108 generates an unstructured indication 122 defining the type-2 poor structure, but does not restructure the software design 110 or design representation 120 because the condition will never occur.

Type-3 Restructuring:

Type-3 poorly structured code is control flow flowing from one non-control process to another non-control process in a different sub-graph on the same decomposition level. For example, type-3 poorly structured code is similar to improper control flow 1304 of FIG. 13. Code Snippet 3 below is an exemplary pseudo-code snippet which exhibits type-3 poor structuring behavior.

Code Snippet 3: Type-3 Poor Structuring Behavior:

```
Main( )
{
    int a=1;
    subroutine1( );
    subroutine2( );
}
```

Code Snippet 3: Type-3 Poor Structuring Behavior:

```
Subroutine1( )
{
start:
    McCabe independent path two
}
Subroutine2( )
{
    McCabe independent path three
    goto Start;
}
```

The type-3 poor structuring behavior will not compile, and is therefore a condition that will never occur. Accordingly, no change is required. In one example of operation of system 100. Design analyzer 108 determines a type-3 poor structure within software design 110. In response, design analyzer 108 generates an unstructured indication 122 defining the type-3 poor structure, but does not restructure the software design 110 or design representation 120 because the condition will never occur.

Type-4 Restructuring:

Type-4 poorly structured code is control flow flowing from one non-control process to another non-control process in a different sub-graph on a different decomposition level, not in the same decomposition pathway. For example, type-4 poorly structured code is similar to improper control flow 1306 of FIG. 13. Code Snippet 4 below is an exemplary pseudo-code snippet which exhibits type-4 poor structuring behavior.

Code Snippet 4: Type-4 Poor Structuring Behavior:

```
Main( )
{
    int a=1;
    subroutine1( );
    subroutine2( );
}
Subroutine1( )
{
    if(condition 1)
    {
        McCabe independent path two
    }
    McCabe independent path three
    goto Next;
Subroutine2( )
{
    Subroutine3( );
    McCabe independent path four
    if(condition 2)
        McCabe independent path five
}
Subroutine3( )
{
Next:
    McCabe independent path six
}
```

The type-4 poor structuring behavior will not compile, and is therefore a condition that will never occur. Accordingly, no change is required. In one example of operation of system 100. Design analyzer 108 determines a type-4 poor structure within software design 110. In response, design analyzer 108 generates an unstructured indication 122 defining the type-4 poor structure, but does not restructure the software design 110 or design representation 120 because the condition will never occur.

Type-5 Restructuring:

Type-5 poorly structured code is control flow flowing from one control kernel to another control kernel in a different sub-graph on the same decomposition level. For example, type-5 poorly structured code is similar to improper control flow 1308 of FIG. 13. Code Snippet 5 below is an exemplary pseudo-code snippet which exhibits type-5 poor structuring behavior.

---
Code Snippet 5: Type-5 Poor Structuring Behavior:
---
```
Main( )
{
        int a=1;
        subroutine1( );
        subroutine2( );
}
Subroutine1( )
{
        goto next;
        if (condition 1)
        {
           McCabe independent path two
        }
        McCabe independent path three
}
Subroutine2( )
{
next:
        McCabe independent path four
        if (condition 2)
           McCabe independent path five
}
```
---

The type-5 poor structuring behavior will not compile, and is therefore a condition that will never occur. Accordingly, no change is required. In one example of operation of system 100. Design analyzer 108 determines a type-5 poor structure within software design 110. In response, design analyzer 108 generates an unstructured indication 122 defining the type-5 poor structure, but does not restructure the software design 110 or design representation 120 because the condition will never occur.

Type-6 Restructuring:

Type-6 poorly structured code is control flow flowing from one control kernel to a process kernel in a different sub-graph on the same decomposition level. For example, type-6 poorly structured code is similar to improper control flow 1310 of FIG. 13. Code Snippet 6 below is an exemplary pseudo-code snippet which exhibits type-6 poor structuring behavior.

---
Code Snippet 6: Type-6 Poor Structuring Behavior:
---
```
Main( )
{
        int a=1;
        subroutine1( );
        subroutine2( );
}
Subroutine1( )
{
        goto Next;
        if (condition 1)
        {
           McCabe independent path two
        }
        McCabe independent path three
}
Subroutine2( )
{
next:
        McCabe independent path four
        if (condition 2)
           McCabe independent path five
}
```
---

The type-6 poor structuring behavior will not compile, and is therefore a condition that will never occur. Accordingly, no change is required. In one example of operation of system 100. Design analyzer 108 determines a type-6 poor structure within software design 110. In response, design analyzer 108 generates an unstructured indication 122 defining the type-6 poor structure, but does not restructure the software design 110 or design representation 120 because the condition will never occur.

Type-7 Restructuring:

Type-7 poorly structured code is control flow flowing from one control kernel to a process kernel in a different sub-graph on a different decomposition level, not in the same decomposition path. For example, type-7 poorly structured code is similar to improper control flow 1312 of FIG. 13. Code Snippet 7 below is an exemplary pseudo-code snippet which exhibits type-7 poor structuring behavior.

---
Code Snippet 7: Type-7 Poor Structuring Behavior:
---
```
Main( )
{
        int a=1;
        subroutine1( );
        subroutine2( );
}
Subroutine1( )
{
next:
        if (condition 1)
        {
           McCabe independent path two
        }
        McCabe independent path three
}
Subroutine2( )
{
        Subroutine3( );
        McCabe independent path four
        if (condition 2)
           McCabe independent path five
}
Subroutine3( )
{
        McCabe independent path six
        goto next;
}
```
---

The type-7 poor structuring behavior will not compile, and is therefore a condition that will never occur. Accordingly, no change is required. In one example of operation of system 100. Design analyzer 108 determines a type-7 poor structure within software design 110. In response, design analyzer 108 generates an unstructured indication 122 defining the type-7 poor structure, but does not restructure the software design 110 or design representation 120 because the condition will never occur Type-8 Restructuring:

Type-8 poorly structured code is control flow flowing from one process kernel to another process kernel in a different sub-graph on a different decomposition level, not in the same decomposition path. For example, type-8 poorly structured code is similar to improper control flow 1314 of FIG. 13. Code Snippet 8 below is an exemplary pseudo-code snippet which exhibits type-8 poor structuring behavior.

---

Code Snippet 8: Type-8 Poor Structuring Behavior:

```
Main( )
{
        int a=1;
        subroutine1( );
        subroutine2( );
}
Subroutine1( )
{
        if (condition 1)
        {
           McCabe independent path two
        }
        if (condition 2)
        {
        next:
           McCabe independent path three
        }
}
Subroutine2( )
{
        Subroutine3( );
        McCabe independent path four
        if (condition 3)
        {
           McCabe independent path five
        }
}
Subroutine 3( )
{
        if (condition 4)
        {
        McCabe independent path six
        goto next;
        }
        McCabe independent path seven
}
```
---

The type-8 poor structuring behavior will not compile, and is therefore a condition that will never occur. Accordingly, no change is required. In one example of operation of system 100. Design analyzer 108 determines a type-8 poor structure within software design 110. In response, design analyzer 108 generates an unstructured indication 122 defining the type-8 poor structure, but does not restructure the software design 110 or design representation 120 because the condition will never occur.

As is shown from the above discussion of each of type-1 through type-8 poor structure behaviors, only the type-1 condition requires restructuring. Accordingly, the amount of work required to convert poorly structured designs into well-structured designs is greatly reduced.

Combination of Features

Features described above as well as those claimed below may be combined in various ways without departing from the scope hereof. The following examples illustrate some possible combinations:

(A) A method for automatically detecting decomposition errors within a software design including determining, using a design analyzer implemented as machine readable instructions stored on a non-transitory media and executed by a processor, poor structure within the software design.

(B) The method as denoted (A), further including generating a poor structure notification to indicate the poor structure.

(C) The method denoted as either (A) or (B), further including restructuring, using the design analyzer, the structure of the software design to remove the poor structure.

(D) In any of the methods denoted as (A) through (C), wherein the step of determining the poor structure includes comparing one or more of input dataflow, output dataflow, control flow, and/or looping structure within each of a first and a second decomposition level of the software design.

(E) In the method denoted as (D), wherein the second decomposition level represents a process of the first decomposition level.

(F) In any of the methods denoted as (D) or (E), wherein a mismatch between any one of the input dataflow, output dataflow, control flow, and/or looping structure indicates the poor structure.

(G) In the method denoted as (F), wherein the step of restructuring includes characterizing the mismatched one of the input dataflow, the output dataflow the control flow, and the looping structure with the first decomposition level as associated with the respective one of the input dataflow, the output dataflow, the control flow, and the looping structure of the second decomposition level.

(H) In any of the methods denoted as (C) through (G), the method further including determining whether dataflow from a datastore to the process within a first decomposition level is characterized in a second decomposition level.

(I) In the method denoted as (H), further including generating the poor structure notification as a missing dataflow error notification when the dataflow is not represented in the second decomposition level.

(J) In any of the methods denoted as (C) through (I), further including analyzing a plurality of processes within a first decomposition level based upon control flow to and from the plurality of processes; and determining a first process, within the plurality of processes, that is unassociated when the first process does not require a second process to be executed prior to execution of the first process.

(K) In the method denoted as (J), wherein the step of restructuring includes generating a first decomposition level including the first process, and generating a second decomposition level including the second process.

(L) In the method denoted as (K), further including generating the poor structure notification as a notification of unassociation when the structure includes an associated process.

(M) In the methods denoted as (A) through (L), wherein the step of determining poor structure includes automatically identifying improper control flow within structure of the software design based upon one or more control flow chosen from the group consisting of: (1) control flow from a first process kernel to a second process kernel within a single sub-graph in a first decomposition level, (2) control flow from a control kernel to a different control kernel, (3) control flow from a process kernel within a first sub-graph to a process kernel within a second sub-graph, the first and second sub-graphs being on the same decomposition level, (4) control flow from a process kernel within a first sub-graph to a process kernel within a second sub-graph, the first and second sub-graphs being on different decomposition levels, (5) control flow from a control kernel within a first sub-graph to a different control kernel within a second sub-graph, the first and second sub-graphs being on the same decomposition level, (6) control flow from a control kernel within a first sub-graph to a process kernel within a second sub-graph, the first and second sub-graphs being on the same decomposition level, (7) control flow from a control kernel within a first sub-graph in a first decomposition level to a process kernel within a second sub-graph in a second decomposition level, the second decomposition level being higher than the first decomposition level, and (8) control flow from a process kernel within a first sub-graph in a first decomposition level to a process kernel within a second sub-graph in a second decomposition level, the second decomposition level being higher than the first decomposition level.

(N) In the method denoted as (M), wherein when the control flow is of type (1), the step of restructuring the structure of the software design including generating a new decomposition level incorporating the first and second processes, the new decomposition level being a lower level than the first decomposition level; and updating the first decomposition level with a third process associated with the new decomposition level, the third process having an associated loop.

(O) In the method denoted as (M), further comprising generating an improper control flow notification identifying the improper control flow type as one or more of types (1)-(8).

(P) A system for automatic detection of decomposition errors within a software design, including a design analyzer, stored within memory and executable by a processor of a development server, for determining a poor structure within the software design.

(Q) In the system denoted as (P), the design analyzer further for generating a poor structure notification to indicate the poor structure.

(R) In either system denoted as (P) or (Q), the design analyzer further for restructuring the structure of the software design to remove the poor structure.

(S) In any of the systems denoted as (P) through (R), The system of claim 11, the design analyzer determining the poor structure by using the processor to analyze a first decomposition level of the software design as compared to a second decomposition level of the software design based upon respective input dataflow, output dataflow, control flow and/or looping structure within each of the first and second decomposition levels, the second decomposition level representing a process within the first decomposition level, wherein a mismatch between any one of the respective input dataflows, output dataflows, control flows, and/or looping structure indicates the poor structure.

(T) In the system denoted as (S), the design analyzer, via the processor, for restructuring the structure to the second structure by characterizing all input dataflow, output dataflow, control dataflow, and/or looping structure within the first decomposition level as associated input dataflow, output dataflow, control dataflow, and/or looping structure within the second decomposition level.

(U) In the either system denoted as (S) or (T), the design analyzer, via the processor, restructuring the structure to the second structure by characterizing dataflow in the first decomposition level, from a datastore to the process, within the second decomposition level.

(V) In the system denoted as (U), the design analyzer further for generating the poor structure notification as a missing dataflow error notification when the dataflow is not characterized in the second decomposition level.

(W) In any of the systems denoted as (P) through (V), the design analyzer determining poor structure by using the processor to analyze a plurality of processes within a first decomposition level based upon control flow to and from the plurality of processes, and determine a first process, within the plurality of processes, that is unassociated when the first processes does not require a second process to be executed prior to execution of the first process.

(X) In the system denoted as (W), the design analyzer restructuring the structure by using the processor to generate a first decomposition level including the first process, and generate a second decomposition level including the second process.

(Y) In the system denoted as (X), the design analyzer further for generating the poor structure notification as a notification of unassociation when the structure includes an unassociated process.

(Z) In any of the systems denoted as (P) through (Y), the design analyzer determining poor structure by using the processor to analyze the software design to identify improper control flow within the structure based upon one or more control flows chosen from the group consisting of (1) control flow from a first process kernel to a second process kernel within a single sub-graph in a first decomposition level, (2) control flow from a control kernel to a different control kernel, (3) control flow from a process kernel within a first sub-graph to a process kernel within a second sub-graph, the first and second sub-graphs being on the same decomposition level, (4) control flow from a process kernel within a first sub-graph to a process kernel within a second sub-graph, the first and second sub-graphs being on different decomposition levels, (5) control flow from a control kernel within a first sub-graph to a different control kernel within a second sub-graph, the first and second sub-graphs being on the same decomposition level, (6) control flow from a control kernel within a first sub-graph to a process kernel within a second sub-graph, the first and second sub-graphs being on the same decomposition level, (7) control flow from a control kernel within a first sub-graph in a first decomposition level to a process kernel within a second sub-graph in a second decomposition level, the second decomposition level being higher than the first decomposition level, (8) control flow from a process kernel within a first sub-graph in a first decomposition level to a process kernel within a second sub-graph in a second decomposition level, the second decomposition level being higher than the first decomposition level.

(AA) In the system denoted as (Z), wherein when the design analyzer identifies type (1) improper control flow, the design analyzer further for generating a new decomposition level incorporating the first and second processes, the new decomposition level being a lower level than the first decomposition level, and updating the first decomposition level with a third process associated with the new decomposition level.

(BB) In the system denoted as (Z), wherein when the design analyzer identifies types (2)-(8) improper control flow, the design analyzer does not restructure the software design structure.

(CC) In any of the systems denoted as (Z) through (BB), the design analyzer further for generating an improper control flow notification defining the improper control type as one or more of types (1)-(8).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for automatically detecting decomposition errors within a software design, comprising:
    determining, using a design analyzer implemented as machine readable instructions stored on non-transitory media and executed by a processor, poor structure within the software design by
        analyzing a plurality of processes within a first decomposition level based upon control flow to and from the plurality of processes; and determining a first process, within the plurality of processes, that is unassociated when the first process does not require a second process to be executed prior to execution of the first process;

generating a poor structure notification to indicate the poor structure; and restructuring, using the design analyzer, the structure of the software design to remove the poor structure by generating a first decomposition level including the first process, and generating a second decomposition level including the second process;

wherein the software design is a hierarchical software design having a plurality of decomposition levels, and wherein the poor structure is improper decomposition within the software design.

2. The method of claim 1, the step of determining the poor structure comprising comparing input dataflow, output dataflow, control flow, and looping structure within each of a first and a second decomposition level of the software design, wherein the second decomposition level represents a process of the first decomposition level, wherein a mismatch between any one of the input dataflow, output dataflow, control flow, and/or looping structure indicates the poor structure.

3. The method of claim 2, the step of restructuring comprising characterizing the mismatched one of the input dataflow, the output dataflow, the control flow, and the looping structure within the first decomposition level as associated with the respective one of the input dataflow, the output dataflow, the control flow, and the looping structure of the second decomposition level.

4. The method of claim 1, further comprising:

determining whether dataflow from a datastore to a process within a first decomposition level is characterized in a second decomposition level; and generating the poor structure notification as a missing dataflow error notification when the dataflow is not represented in the second decomposition level.

5. The method of claim 1, further comprising generating the poor structure notification as a notification of unassociation when the software design includes an unassociated process.

6. The method of claim 1, the step of determining poor structure comprising automatically identifying improper control flow within structure of the software design based upon one or more control flow chosen from the group consisting of:

(1) control flow from a first process kernel to a second process kernel within a single sub-graph in a first decomposition level, (2) control flow from a control kernel to a different control kernel, (3) control flow from a process kernel within a first sub-graph to a process kernel within a second sub-graph, the first and second sub-graphs being on the same decomposition level, (4) control flow from a process kernel within a first sub-graph to a process kernel within a second sub-graph, the first and second sub-graphs being on different decomposition levels, (5) control flow from a control kernel within a first sub-graph to a different control kernel within a second sub-graph, the first and second sub-graphs being on the same decomposition level, (6) control flow from a control kernel within a first sub-graph to a process kernel within a second sub-graph, the first and second sub-graphs being on the same decomposition level, (7) control flow from a control kernel within a first sub-graph in a first decomposition level to a process kernel within a second sub-graph in a second decomposition level, the second decomposition level being higher than the first decomposition level, and (8) control flow from a process kernel within a first sub-graph in a first decomposition level to a process kernel within a second sub-graph in a second decomposition level, the second decomposition level being higher than the first decomposition level.

7. The method of claim 6, wherein when the control flow is type (1), the step of restructuring the structure of the software design comprising:

generating a new decomposition level incorporating the first and second processes, the new decomposition level being a lower level than the first decomposition level; and updating the first decomposition level with a third process associated with the new decomposition level, the third process having an associated loop.

8. The method of claim 6, further comprising generating an improper control flow notification identifying the improper control flow type as one or more of types (1)-(8).

9. A system for automatic detection of decomposition errors within a software design, comprising:

a design analyzer, stored within memory and executable by a processor of a development server, for determining a poor structure within the software design analyzing, via the processor, a plurality of processes within a first decomposition level based upon control flow to and from the plurality of processes, and determining, via the processor, a first process, within the plurality of processes, that is unassociated when the first processes does not require a second process to be executed prior to execution of the first process;

generating a poor structure notification to indicate the poor structure; and restructuring the structure of the software design to remove the poor structure by generating, via the processor, a first decomposition level including the first process, and generating, via the processor, a second decomposition level including the second process;

wherein the software design is a hierarchical software design having a plurality of decomposition levels, and wherein the poor structure is improper decomposition within the software design.

10. The system of claim 9, the design analyzer determining the poor structure by using the processor to analyze a first decomposition level of the software design as compared to a second decomposition level of the software design based upon respective input dataflow, output dataflow, control flow and/or looping structure within each of the first and second decomposition levels, the second decomposition level representing a process within the first decomposition level, wherein a mismatch between any one of the respective input dataflows, output dataflows, control flows, and/or looping structure indicates the poor structure.

11. The system of claim 10, the design analyzer, via the processor, restructuring the structure to the second structure by characterizing all input dataflow, output dataflow, control dataflow, and/or looping structure within the first decomposition level as associated input dataflow, output dataflow, control dataflow, and/or looping structure within the second decomposition level.

12. The system of claim 10, the design analyzer, via the processor, restructuring the structure to the second structure by characterizing dataflow in the first decomposition level, from a datastore to the process, within the second decomposition level.

13. The system of claim 12, the design analyzer further for generating the poor structure notification as a missing dataflow error notification when the dataflow is not characterized in the second decomposition level.

14. The system of claim 9, the design analyzer further for generating the poor structure notification as a notification of unassociation when the structure includes an unassociated process.

15. The system of claim 9, the design analyzer determining poor structure by using the processor to analyze the software design to identify improper control flow within the structure based upon one or more control flows chosen from the group consisting of
   (1) control flow from a first process kernel to a second process kernel within a single sub-graph in a first decomposition level,
   (2) control flow from a control kernel to a different control kernel,
   (3) control flow from a process kernel within a first sub-graph to a process kernel within a second sub-graph, the first and second sub-graphs being on the same decomposition level,
   (4) control flow from a process kernel within a first sub-graph to a process kernel within a second sub-graph, the first and second sub-graphs being on different decomposition levels,
   (5) control flow from a control kernel within a first sub-graph to a different control kernel within a second sub-graph, the first and second sub-graphs being on the same decomposition level,
   (6) control flow from a control kernel within a first sub-graph to a process kernel within a second sub-graph, the first and second sub-graphs being on the same decomposition level,
   (7) control flow from a control kernel within a first sub-graph in a first decomposition level to a process kernel within a second sub-graph in a second decomposition level, the second decomposition level being higher than the first decomposition level,
   (8) control flow from a process kernel within a first sub-graph in a first decomposition level to a process kernel within a second sub-graph in a second decomposition level, the second decomposition level being higher than the first decomposition level.

16. The system of claim 15, wherein when the design analyzer identifies type (1) improper control flow, the design analyzer further for
   generating a new decomposition level incorporating the first and second processes, the new decomposition level being a lower level than the first decomposition level, and
   updating the first decomposition level with a third process associated with the new decomposition level.

17. The system of claim 15, wherein when the design analyzer identifies types (2)-(8) improper control flow, the design analyzer does not restructure the software design structure.

18. The system of claim 15, the design analyzer further for generating an improper control flow notification defining the improper control type as one or more of types (1)-(8).

* * * * *